US009695065B2

(12) United States Patent
Koehler et al.

(10) Patent No.: US 9,695,065 B2
(45) Date of Patent: Jul. 4, 2017

(54) COMBINATION OF CHEMICAL ADDITIVES FOR ENHANCEMENT OF WATER FLUX OF A MEMBRANE

(71) Applicant: LG NANOH2O, INC., El Segundo, CA (US)

(72) Inventors: Jeff Koehler, Pasadena, CA (US); Alexis Foster, Los Angeles, CA (US); Keunwon Song, Torrance, CA (US); Young Ju Lee, Daejeon (KR); Chongkyu Shin, Rancho Palos Verdes, CA (US)

(73) Assignee: LG NANOH2O, INC., El Segundo, CA (US)

( * ) Notice: Subject to any disclaimer, the term of this patent is extended or adjusted under 35 U.S.C. 154(b) by 121 days.

(21) Appl. No.: 14/730,151

(22) Filed: Jun. 3, 2015

(65) Prior Publication Data

US 2016/0355416 A1    Dec. 8, 2016

(51) Int. Cl.
*C02F 1/44* (2006.01)
*B01D 61/02* (2006.01)
(Continued)

(52) U.S. Cl.
CPC ............ *C02F 1/441* (2013.01); *B01D 61/025* (2013.01); *B01D 67/0088* (2013.01);
(Continued)

(58) Field of Classification Search
None
See application file for complete search history.

(56) References Cited

U.S. PATENT DOCUMENTS 3,231,597 A   1/1966   Fischer
3,291,660 A   12/1966   Oberth et al.
(Continued)

FOREIGN PATENT DOCUMENTS

WO   2004/056737 A1   7/2004
WO   2014/080426 A1   5/2014

OTHER PUBLICATIONS

Zapp, Jr, "Inhalation toxicity of hexamethylphosphoramide", du Pont, 1975.*

(Continued)

*Primary Examiner* — Krishnan S Menon
(74) *Attorney, Agent, or Firm* — Dentons US LLP

(57) ABSTRACT

Provided is an interfacial polymerization process for preparation of a highly permeable thin film composite membrane, which can be used for nanofiltration, or forward or reverse osmosis, for use with tap water, seawater and brackish water, particularly for use with brackish water at low energy conditions. The process includes contacting a porous support membrane with an aqueous phase containing a polyamine and a flux enhancing combination, which includes a metal chelate additive containing a bidentate ligand and a metal atom or metal ion and a dialkyl sulfoxide, to form a coated support membrane, and applying an organic phase containing a polyfunctional acid halide to the coated support membrane to interfacially polymerize the polyamine and the polyfunctional acid halide to form a discrimination layer of the thin film composite membrane. Also provided are the membranes prepared by the methods and reverse osmosis modules containing the membranes.

20 Claims, 4 Drawing Sheets

(51) Int. Cl.
*B01D 71/60* (2006.01)
*B01D 67/00* (2006.01)
*C02F 103/08* (2006.01)
*B01D 69/12* (2006.01)

(52) U.S. Cl.
CPC ............ *B01D 69/12* (2013.01); *B01D 71/60* (2013.01); *C02F 2103/08* (2013.01)

(56) References Cited

U.S. PATENT DOCUMENTS

| | | |
|---|---|---|
| 3,926,798 A | 12/1975 | Cadotte |
| 4,039,440 A | 8/1977 | Cadotte |
| 4,214,994 A | 7/1980 | Kitano et al. |
| 4,277,344 A | 7/1981 | Cadotte |
| 4,337,154 A | 6/1982 | Fukuchi et al. |
| 4,482,736 A | 11/1984 | Forster et al. |
| 4,842,736 A | 6/1989 | Bray et al. |
| 4,855,048 A | 8/1989 | Tang et al. |
| 4,902,424 A | 2/1990 | Wrasidlo |
| 4,948,507 A | 8/1990 | Tomaschke |
| 4,983,291 A | 1/1991 | Chau et al. |
| 5,108,607 A | 4/1992 | Kraus et al. |
| 5,543,046 A | 8/1996 | Van Rijn |
| 5,641,466 A | 6/1997 | Ebbesen et al. |
| 5,658,460 A | 8/1997 | Cadotte et al. |
| 6,153,133 A | 11/2000 | Kaimai et al. |
| 6,337,018 B1 | 1/2002 | Mickols |
| 6,437,189 B1 | 8/2002 | Prasad et al. |
| 6,783,745 B1 | 8/2004 | Voronov et al. |
| 7,064,214 B2 | 6/2006 | Senanayake et al. |
| 7,078,007 B2 | 7/2006 | Yu et al. |
| 7,109,140 B2 | 9/2006 | Marand et al. |
| 7,282,573 B2 | 10/2007 | Chaudhuri et al. |
| 7,422,667 B1 | 9/2008 | Zhou et al. |
| 7,490,725 B2 | 2/2009 | Pinnau et al. |
| 7,491,334 B2 | 2/2009 | Comstock |
| 7,648,765 B2 | 1/2010 | Takahashi et al. |
| 7,816,564 B2 | 10/2010 | Balaban et al. |
| 8,163,814 B2 | 4/2012 | Emrick et al. |
| 8,173,211 B2 | 5/2012 | Shaffer et al. |
| 8,177,978 B2 | 5/2012 | Kurth et al. |
| 8,505,743 B2 | 8/2013 | Sarkar et al. |
| 8,505,745 B2 | 8/2013 | Mayes et al. |
| 8,567,612 B2 | 10/2013 | Kurth et al. |
| 8,580,341 B2 | 11/2013 | Wang et al. |
| 8,733,558 B2 * | 5/2014 | Mickols ............. B01D 67/0093 210/490 |
| 8,754,139 B2 * | 6/2014 | Allen .................. B01D 61/025 521/25 |
| 8,828,533 B2 | 9/2014 | Dai et al. |
| 2006/0116498 A1 | 6/2006 | Wu et al. |
| 2008/0190836 A1 | 8/2008 | Beppu et al. |
| 2009/0050558 A1 | 2/2009 | Ishizuka et al. |
| 2011/0174728 A1 | 7/2011 | Eisen et al. |
| 2012/0080381 A1 | 4/2012 | Wang et al. |
| 2012/0292249 A1 | 11/2012 | Wang et al. |
| 2013/0199988 A1 | 8/2013 | Jons et al. |
| 2014/0014575 A1 | 1/2014 | Kwon et al. |

OTHER PUBLICATIONS

Bazel; "The Effect of Solution Viscosity on the Flux and Rejection of Polyamide Membranes"; Thesis for Master of Science Degree; Ben-Gurion University of the Negev Jacob Institute for Desert Research; Sep. 2011; 65 Pages.
Cahill et al.; "Microscopy and Microanalysis of Reverse-Osmosis and Nanofiltration Membranes" MRS Bulletin, vol. 33; (27-32); Jan. 2008; 6 Pages.
Chen et al.; "Novel Thin-Film Composite Membranes with Improved Water Flux from Sulfonated Cardo Poly(arylene ether sulfone) Bearing Pendant Amino Groups"; Journal of Membrane Sciences; 310 (2008) 102-109; 8 Pages.
Duan et al.; "Influence of Hexamethyl Phosphoramide on Polyamide Composite Reverse Osmosis Membrane Performance"; Separation and Purification Technology 75 (2010) 145-155; 11 Pages.
Gaid; "A Large Review of the Pre Treatment"; Expanding Issues in Desalination, Prof. Robert Y. Ning (Ed.), ISBN: 978-953-307-624-9, InTech, Available from: http://www.intechopen.com/books/expanding-issues-in-desalination/a-large-review-of-the-pre-treatment.; (2011); 55 Pages.
Ghosh et al.; "Impacts of Reaction and Curing Conditions on Polyamide Composite Reverse Osmosis Membrane Properties"; Journal of Membrane Science 311 (2008) 34-45; 12 Pages.
Gohil et al; "Development of High Flux Thin-Film Composite Membrane for Water Desalination: A Statistical Study Using Response Surface Methodology"; Desalination and Water Treatment (2014) 52:28-30, 5219-5228; 11 Pages.
Ikeda et al.; "Synthesis of Substituted Crown Ethers from Oligoethylene Glycols"; Journal of Organic Chemistry (1980) 45:5355-5358; 4 Pages.
Kim et al.; "Positron Annihilation Spectroscopic Evidence to Demonstrate the Flux-Enhancement Mechanism in Morphology-Controlled Thin-Film Composite (TFC) Membrane"; Environ. Sci. Technol. (2005) 39:1764-1770; 7 Pages.
Kochkodan et al.; "A Comprehensive Review on Surface Modified Polymer Membranes for Biofouling Mitigation" Desalination 356 (2015) 187-207; 21 Pages.
Kwak et al; "Structure-Motion-Performance Relationship of Flux-Enhanced Reverse Osmosis (RO) Membranes Composed of Aromatic Polyamide Thin Films"; Environ. Sci. Technol. (2001) 35:4334-4340; 7 Pages.
Kwak et al.; "Use of Atomic Force Microscopy and Solid-State NMR Spectroscopy to Characterize Structure-Property-Performance Correlation in High-Flux Reverse Osmosis (RO) Membranes"; Journal of Membrane Sciences; 158 (1999) 143-153; 11 Pages.
Lau et al.; "A Recent Progress in Thin Film Composite Membrane: A Review"; Desalination 287 (2012) 190-199; 10 Pages.
Liu et al.; "Thin-Film Composite Membrane Formed by Interfacial Polymerization of Polyvinylamine (PVAm) and Trimesoyl Chloride (TMC) for Nanofiltration"; Desalination; 288 (2012) 98-107; 10 Pages.
Saehan Industries Inc.; "Pilot Study for Evaluation of Saehan FRM RO Elements at Bedok Water Reclamation Plant, Singapore"; Project Report No. CAWT/2003/042/R; Singapore Utilities International Pte, Ltd., Aug. 2003; 13 Pages.
Tarboush et al.; "Recent Advances in Thin Film Composite (TFC) Reverse Osmosis and Nanofiltration Membranes for Desalination"; J. Applied Membrane Science & Technology, vol. 10, Dec. 2009, pp. 41-50; 10 Pages.
Tarboush et al.; "Preparation of thin-film-composite polyamide membranes for desalination using novel hydrophilic surface modifying macromolecules"! J. Membrane Science 325 (2008) 166-175; 10 Pages.
Tu et al.; "Boron Removal by Reverse Osmosis Membranes in Seawater Desalination Applications" Separation and Purification Technology 75 (2010) 87-101; 15 Pages.
Wend et al.; "Pretreatment for Membrane Water Treatment Systems: A Laboratory Study"; Water Research 37 (2003) 3367-3378; 12 Pages.
Xie et al.; "Polyamide Interfacial Composite Membranes Prepared from m-Phenylene Diamine, Trimesoyl Chloride and a new Disulfonated Diamine"; Journal of Membrane Science 403-404 (2012) 152-161; 10 Pages.

* cited by examiner

COMBINATION OF CHEMICAL ADDITIVES FOR ENHANCEMENT OF WATER FLUX OF A MEMBRANE

FIELD OF THE INVENTION

The present invention relates to thin film composite (TFC) membranes, including membranes used for nanofiltration, reverse or forward osmosis, e.g., to purify water, including tap water, brackish water and sea water, and more particularly to processes for producing such membranes, the processes including the addition of chemical additives that enhance water flux while maintaining or improving rejection characteristics of the membranes.

BACKGROUND OF THE INVENTION

A thin film composite (TFC) membrane is a membrane that has layers of dissimilar materials joined together to form a single membrane. This layered construction permits the use of material combinations that optimize performance and durability of the membrane.

TFC membranes are used for nanofiltration, and in reverse osmosis and forward osmosis membranes for treating tap water, brackish water and sea water. Such membranes typically are made by interfacial polymerization of a monomer in a nonpolar (e.g., organic) phase together with a monomer in a polar (e.g., aqueous) phase on a porous support membrane. TFC membranes are used where flux and substantial rejection characteristics are required, e.g., in the purification of water. Various materials and chemical additives have been added to TFC membranes to increase flux without reducing rejection characteristics and have met with limited success. Such membranes are also subject to fouling resulting in reduced flux as contaminants, e.g., material from the brackish or seawater to be purified, build up on the surface of the TFC membrane.

What are needed are techniques for further improving flux while maintaining or improving rejection characteristics, resisting the effects of fouling, as well as techniques for improving commercial processing of such improved TFC membranes.

SUMMARY OF THE INVENTION

Accordingly, the present invention is directed to chemical additives for thin film composite membranes that enhance flux of the membranes while maintaining or improving salt rejection, and that substantially obviate one or more of the problems due to limitations and disadvantages of the related art.

In one aspect, processes for the production of TFC membranes having increased flux are provided, where the process includes providing a porous support membrane, and contacting on the porous support membrane a first solution containing a polyamine, such as 1,3-diaminobenzene, and with a second solution containing polyfunctional acyl halide, e.g., trimesoyl chloride, where either the first solution or the second solution or both solutions also contain a combination of flux additives that includes a dialkyl sulfoxide and a metal chelate additive that contains a bidentate ligand and a metal atom or metal ion, where when the solutions are contacted, interfacial polymerization between the polyamine and the polyfunctional acid halide form a discrimination layer on the porous support membrane to form a highly permeable reverse osmosis membrane with increased flux, rejection and anti-fouling characteristics.

One object of the invention is to provide an interfacial polymerization process for preparing a highly permeable TFC membrane, such as a RO membrane, comprising: contacting on a porous support membrane, a) a first solution containing 1,3-diaminobenzene, and b) a second solution containing trimesoyl chloride, wherein at least one of solutions a) and b) contains a combination of flux additives that includes a dialkyl sulfoxide and a metal chelate additive that contains a bidentate ligand and a metal atom or metal ion when said solutions are first contacted, and recovering a highly permeable RO membrane. In some embodiments, the first solution includes a polar solvent. In some embodiments, the polar solvent includes water. In some embodiments, the first solution is an aqueous solution. In some embodiments, the combination of flux additives that includes a dialkyl sulfoxide and a metal chelate additive that contains a bidentate ligand and a metal atom or metal ion is in the first solution. In some embodiments, the second solution includes a non-polar organic solvent. In some embodiments, the combination of flux additives that includes a dialkyl sulfoxide and a metal chelate additive that contains a bidentate ligand and a metal atom or metal ion is in the second solution.

An advantage of the present invention is that the highly permeable TFC membranes, such as RO membranes, produced by the provided methods can purify brackish water containing 2,000 ppm or less NaCl at low pressures. For example, modules containing membranes produced using the processes described herein can be used to produce a stream of potable water from brackish water at relatively low pressure conditions, i.e. not greater than about 225 psi, and in some embodiments at pressures of about 150 psi or less.

An advantage of these low pressure conditions is that pressure vessels, pumps, valves, and piping having a more moderate pressure rating than usually require for reverse osmosis systems can be used, thereby avoiding the cost of expensive high pressure rated systems. This substantially reduces the initial capital costs of the desalination system.

Another advantage is the reduction in operating costs compared to standard high pressure seawater desalination systems. Because the operating pressure is lower than that required for conventional high pressure seawater RO desalinization installations, the power costs are lower.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

Provided are processes for preparing a reverse osmosis membrane. An exemplary process includes preparing an aqueous phase containing a polyamine and a flux enhancing combination that includes a metal chelate additive containing a bidentate ligand and a metal atom or metal ion and a dialkyl sulfoxide, and preparing an organic phase containing a polyfunctional acid halide. When the aqueous phase and organic phase are brought into contact with each other, interfacial polymerization occurs at the interface between the aqueous phase layer and the organic phase layer to form a discrimination layer. The discrimination layer can be a composite polyamide membrane prepared by coating a porous support membrane with a polyfunctional amine monomer, most commonly coated from an aqueous phase solution. Although water is a preferred polar solvent, other solvents, such as lower monohydric alcohols, ketones, and acetonitrile can be used. A polyfunctional acid halide subsequently can be applied to the support membrane, typically from an organic phase solution.

In some embodiments, the polar solution is an aqueous phase containing a polyamine and is coated first on the porous support to form a coated support membrane, followed by applying the organic phase containing the acyl halide solution. The monomers can react when in contact, thereby polymerizing to produce a polymer (e.g., polyamide) discrimination layer at the upper surface of the support membrane. Interfacial polymerization of the polyamine and the polyfunctional acid halide form a discrimination layer thereby forming a reverse osmosis (RO) membrane, where the RO membrane includes the porous support membrane and the discrimination layer. The reverse osmosis membrane prepared by the process can be characterized by having a flux and a salt rejection that is greater than the flux and the salt rejection of a membrane prepared in the absence of the flux enhancing combination.

In some embodiments, the polyamine used in the process can be selected from the group consisting of diaminobenzene, triaminobenzene, m-phenylene diamine, p-phenylene diamine, 1,3,5-diaminobenzoic acid, 2,4-diaminotoluene, 2,4-diaminoanisole, xylylene-diamine, ethylenediamine, propylenediamine, piperazine, and tris(2-diaminoethyl) amine. In some embodiments, the polyfunctional acid halide used in the process can be selected from the group consisting of trimesoyl chloride, trimellitic acid chloride, isophthaloyl chloride, and terephthaloyl chloride.

In some embodiments, the bidentate ligand used in the process can be selected from among:

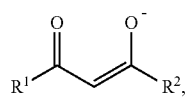

Formula 1

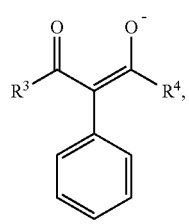

Formula 2

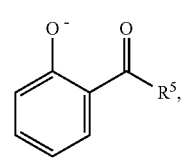

Formula 3

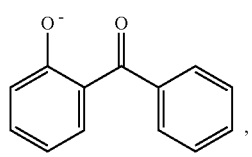

Formula 4

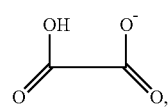

Formula 5

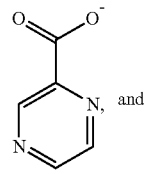

Formula 6 and

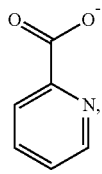

Formula 7 where each of $R^1$, $R^2$, $R^3$, $R^4$ and $R^5$ separately is selected from among a $C_1$-$C_{10}$ alkyl, a halogenated $C_1$-$C_{10}$ alkyl, a 5-membered or 6-membered aromatic ring, an aromatic bicyclic ring system containing two fused 6-membered rings, and an aromatic bicyclic ring system containing a 5-membered ring fused to a 6-membered aromatic ring. Each of $R^1$, $R^2$, $R^3$, $R^4$ and $R^5$ separately can be selected from among $C_1$-$C_6$ alkyl and halogenated $C_1$-$C_6$ alkyl. Any one of $R^1$, $R^2$, $R^3$, $R^4$ or $R^5$ can be selected from among phenyl, benzyl, a $C_1$-$C_5$ aromatic ring containing 1 to 4 hetero atoms selected from among N, O and S, and a $C_5$-$C_9$ bicyclic aromatic ring system containing 1 to 4 hetero atoms selected from among N, O and S. Any one of $R^1$, $R^2$, $R^3$, $R^4$ or $R^5$ can be selected from among furanyl, pyrrolyl, thiopheneyl, imidazolyl, pyrazolyl, oxazolyl, isoxazolyl, thiazolyl, phenyl, pyridinyl, pyrazinyl, pyrimidinyl, pyridazinyl, purinyl, benzoxazolyl, benzothiazolyl, benzisoxazolyl, benzimidazolyl, benzothiopheneyl, indazolyl, benzo[c]-thiopheneyl, isoindolyl, isobenzofuranyl, naphthaleneyl, quinolinyl, quinoxalinyl, quinazaolinyl, and isoquinolinyl.

The bidentate ligand can be an acetylacetonate (acac) or fluorinated acetylacetonate. In some embodiments, the metal chelate additive containing a bidentate ligand and a metal atom or metal ion can be selected from among Al(acac)$_3$, Al(F6acac)$_3$, Ba(acac)$_2$, Ba(F6acac)$_2$, Be(acac)$_2$, Be(F6acac)$_2$, Ca(acac)$_2$, Ca(F6acac)$_2$, Cd(acac)$_2$, Cd(F6acac)$_2$, Ce(acac)$_3$, Ce(F6acac)$_3$, Cr(acac)$_3$, Co(acac)$_3$, Cu(acac)$_2$, Cu(F6acac)$_2$, Dy(acac)$_3$, Er(acac)$_3$, Fe(acac)$_2$, Fe(acac)$_3$, Ga(acac)$_3$, Hf(acac)$_4$, In(acac)$_3$, K(acac), Li(acac), Mg(acac)$_2$, Mg(F6acac)$_2$, Mn(acac)$_2$, Mn(acac)$_3$, MoO$_2$(acac)$_2$, MoO$_2$(F6acac)$_2$, Na(acac), Nd(acac)$_3$, Nd(F6acac)$_3$, Ni(acac)$_2$, Ni(F6acac)$_2$, Pd(acac)$_2$, Pr(acac)$_3$, Pr(F6acac)$_3$, Ru(acac)$_3$, Ru(F6acac)$_3$, Sc(acac)$_2$, Sc(F6acac)$_2$, Sm(acac)$_3$, Sn(acac)$_2$, Sn(acac)$_2$Cl$_2$, t-butyl-Sn(acac)$_2$, t-butyl-Sn(acac)$_2$Cl$_2$, Sn(F6acac)$_2$, Sr(acac)$_2$, Sr(F6acac)$_2$, Tb(acac)$_3$, V(acac)$_3$, Y(acac)$_3$, Y(F6acac)$_3$, Zn(acac)$_2$, Zn(F6acac)$_2$, and Zr(acac)$_4$, where F6acac refers to 1,1,1,5,5,5-hexafluoroacetyl-acetonate.

In some embodiments, the bidentate ligand used in the process can be a beta-diketonate or a fluorinated beta-diketonate. For example, the bidentate ligand can be selected from among pentane-2,4-dionate, 1,5-difluoro-pentane-2,4-dionate, 1,1,5,5-tetrafluoropentane-2,4-dionate, 1,1,1,5,5,5-hexafluoro-pentane-2,4-dionate, propane-1,3-dionate, butane-1,3-dionate, 4-fluorobutane-1,3-dionate, 4,4-difluoro-butane-1,3-dionate, 4,4,4-trifluorobutane-1,3-dionate, heptane-3,5-dionate, 1-fluoro-hexane-2,4-dionate, 1,5-difluoropentane-2,4-dionate, 1,1,5-trifluoropentane-2,4-dionate, 1,1,5,5-tetrafluoro-pentane-2,4-dionate, 1,1,1,5,5-pentafluoro-pentane-2,4-dionate, 1,1,1,5,5,5-hexa-fluoropentane-2,4-dionate and octane-3,5-dionate and combinations thereof. In some embodiments of the process, the amount of bidentate ligand in the metal chelate additive can yield a concentration of bidentate ligand in the aqueous phase of from about 0.001 wt % to about 1 wt %, based on the weight of the aqueous phase.

In the processes provided herein, the metal atom or metal ion of the metal chelate additive can be selected from Group 2 or Group 13 of the periodic table. In some embodiments, the metal atom or metal ion is an alkaline earth metal. For example, the metal atom or metal ion can be selected from the group consisting of beryllium (Be), magnesium (Mg), calcium (Ca), strontium (Sr), and barium (Ba). In some embodiments, the metal atom or metal ion is selected from the group consisting of aluminum (Al), gallium (Ga), and indium (In). The amount of metal atom or metal ion in the metal chelate additive can yield a concentration of metal atom or metal ion in the aqueous phase of from about 0.00001 wt % to about 1 wt %, based on the weight of the aqueous phase.

The amount of metal chelate additive in the flux enhancing combination added to the aqueous phase can yield a concentration of metal chelate additive in the aqueous phase of from about 0.001 wt % to about 1 wt %, based on the weight of the aqueous phase.

In the processes provided herein, the amount of dialkyl sulfoxide present in the flux enhancing combination results in a concentration of dialkyl sulfoxide in the aqueous phase of from about 0.5 wt % to about 5 wt %, or from about 1 wt % to about 4.25 wt % based on the weight of the aqueous phase. Any dialkyl sulfoxide can be selected. In some embodiments, a di($C_1$-$C_6$-alkyl) sulfoxide, such as dimethyl sulfoxide or diethyl sulfoxide.

In some embodiments, the process further includes adding a surfactant to the aqueous phase prior to applying the aqueous phase to the porous support membrane. The surfactant can be selected from among nonionic, cationic, anionic, and zwitterionic surfactants. Exemplary surfactants include sodium lauryl sulfate (SLS), alkyl ether sulfates, alkyl sulfates, olefin sulfonates, alkyl ether carboxylates, sulfosuccinates, aromatic sulfonates, octylphenol ethoxylates, ethoxylated nonylphenols, alkyl poly(ethylene oxide), copolymers of poly(ethylene oxide) and poly(propylene oxide) (commercially called poloxamers or poloxamines), alkyl polyglucosides, e.g., octyl glucoside or decyl maltoside, fatty alcohols, e.g., cetyl alcohol or oleyl alcohol, cocamide MEA, cocamide DEA, alkyl hydroxyethyl dimethyl ammonium chloride, cetyl-trimethyl ammonium bromide or chloride, hexadecyl-trimethyl ammonium bromide or chloride, and alkyl betaines. Preferred among these are SLS, octylphenol ethoxylates, and ethoxylated nonylphenols. When present, the amount of surfactant in the aqueous phase can be from about 0.005 wt % to about 0.5 wt % based on the weight of the aqueous phase.

The process further can include adding a processing aid selected from among a surfactant, a co-solvent, a drying agent, a catalyst or any combination thereof to the aqueous phase prior to applying the aqueous phase to the porous support membrane. The amount of processing aid in the aqueous phase can be from about 0.001 wt % to about 10 wt % based on the weight of the aqueous phase.

The co-solvent can be a polar aprotic solvent. Exemplary polar aprotic solvents include dimethylformamide, dimethylacetamide, tetrahydrofuran, hexamethyl phosphoramide, 1,3-dimethyl-2-imidazolidinone, diethyl ether, N-methyl-2-pyrrolidone, dichloromethane, ethyl acetate, methyl acetate, isopropyl acetate, acetone, methyl ethyl ketone, methyl isobutyl ketone, acetonitrile and any combination thereof. In some embodiments, the polar aprotic solvent includes hexamethyl phosphoramide. The hexamethyl phosphoramide can be present in the polar phase, e.g., the aqueous phase in an amount from about 0.05 wt % to about 5 wt %.

The processing aid can include a drying agent. A drying agent can be included in order to prevent loss of permeation of the discrimination layer upon drying. Any drying agent that does not interfere with the interfacial polymerization can be used. Exemplary drying agents in a hydrocarbon, an ether, glycerin, citric acid, a glycol, glucose, sucrose, sodium citrate, triethylammonium camphorsulfonate, triethylammonium benzenesulfonate, triethylammonium toluenesulfonate, triethylammonium methane sulfonate, ammonium camphor sulfonate, and ammonium benzene sulfonate and any combination thereof. When present, a drying agent can be present in the aqueous phase in an amount from about 0.001 wt % to about 10 wt % based on the weight of the aqueous phase.

In the processes provided herein, the aqueous phase or the organic phase or both can include nanoparticles. The nanoparticles can be zeolites or carbon nanoparticles (e.g., fullerenes or carbon nanotubes) or combinations thereof. When present, the nanoparticles can present in the aqueous phase or in the organic phase of both in an amount from about 0.001 wt % to about 0.5 wt % based on the weight of the solution.

Also provided are reverse osmosis membranes prepared according to the processes provided herein. In some instances, the membrane can exhibit a flux of at least 20 gfd, determined by exposing the membrane to deionized water containing 2,000 ppm NaCl at a temperature of 25° C. and a pressure of 150 psi. In some instances, the membrane can exhibit a salt rejection of at least 99.3%, determined by exposing the membrane to deionized water containing 2,000 ppm NaCl at a temperature of 25° C. and a pressure of 150 psi. In some embodiments, the membrane exhibits a water flux of from about 21 gfd to about 27 gfd and a salt rejection of from about 99.3% to about 99.7% when the membrane is exposed to deionized water containing 2,000 ppm NaCl at a temperature of 25° C. and a pressure of 150 psi.

Also provided are methods of purifying seawater or brackish water. Seawater has a salinity of roughly 35,000 ppm, but can vary from about 32,000 ppm to about 39,000 ppm NaCl. The brackish water can contain 2,000 ppm or less NaCl. In some instances, the methods include contacting brackish water with a reverse osmosis membrane prepared by the processes described herein. A hydrostatic pressure is applied to the membrane by the water to be purified. In some instances, a hydrostatic pressure of about 225 psi or less is applied to the membrane via the seawater or brackish water. Low power methods also are provided. In these methods, a hydrostatic pressure of about 150 psi or less is applied to the membrane via the seawater or brackish water. Using membranes prepared by the methods provided herein, the methods of purifying seawater or brackish water can produce a flux of at least 20 gfd.

Also provided are reverse osmosis elements that include a reverse osmosis membrane prepared by any of the methods described herein. In the element, the reverse osmosis membrane can be spirally wound around a central porous permeate collection tube.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

A. Definitions

Figure 1:
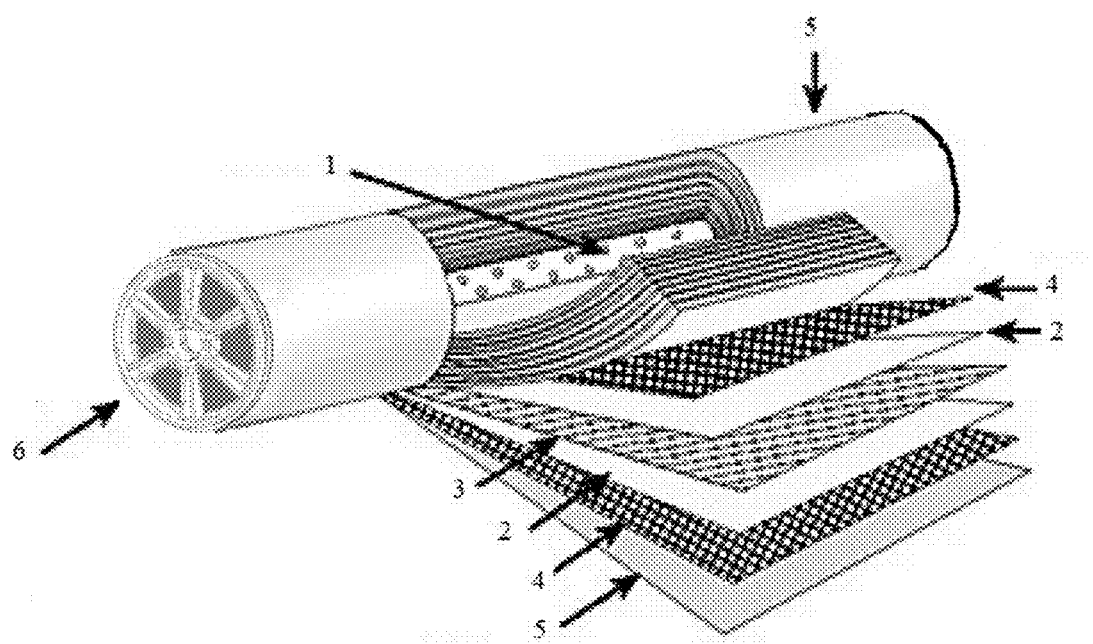
FIG. 1 is an exemplary embodiment of a wound module.

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety. In the event that there are a plurality of definitions for terms herein, those in this section prevail. Where reference is made to a URL or other such identifier or address, it is understood that such identifiers can change and particular information on the internet can come and go, but equivalent information can be found by searching the internet. Reference thereto evidences the availability and public dissemination of such information.

As used here, the singular forms "a," "an" and "the" include plural referents unless the context clearly dictates otherwise.

As used herein, ranges and amounts can be expressed as "about" a particular value or range. About also includes the exact amount. Hence "about 5 percent" means "about 5 percent" and also "5 percent." "About" means within typical experimental error for the application or purpose intended.

As used herein, "optional" or "optionally" means that the subsequently described event or circumstance does or does not occur, and that the description includes instances where said event or circumstance occurs and instances where it does not. For example, an optional component in a system means that the component may be present or may not be present in the system.

As used herein, the term "alkyl" refers to a straight, branched, or cyclic chain containing at least one carbon atom and no double or triple bonds between carbon atoms. The number of carbon atoms can be specified, for example, 1 to 6 carbon atoms, 2 to 5 carbon atoms, 3 to 4 carbon atoms, 2 to 6 carbon atoms, 3 to 6 carbon atoms, 2 to 4 carbon atoms and 1 to 5 carbon atoms. The number of carbon atoms can be represented, e.g., as $C_1$-$C_6$.

As used herein, $C_1$-$C_x$ includes $C_1$-$C_2$, $C_1$-$C_3$, $C_1$-$C_4$, $C_2$-$C_4$, ... $C_1$-$C_x$.

As used herein, "aromatic ring" refers to a ring containing an array of delocalized π-molecular orbitals occupied by 4n+2 electrons, where n is an integer. Many aromatic rings or ring systems have 6 π-electrons. The aromatic ring can be a 5- or 6-membered monocyclic ring, or can be a bicyclic system, e.g., containing two or more fused 5- or 6-membered rings.

As used herein, "flux" refers to the amount of material that flows through a unit area per unit time, such as the amount of liquid flowing through a given membrane area during a given time. Generally, flux depends on the thickness of the membrane, the feed composition, the temperature of the feed, the downstream vacuum, and the feed-side pressure.

As used herein, a "combination" refers to any association between two items or among more than two items. The association can be spatial or refer to the use of the two or more items for a common purpose.

As used herein, a "flux enhancing combination" refers to a combination of at least two components that together improve the flux of a membrane.

As used herein, a "chelate" refers to a combination that includes a metal atom or ion and a chelating agent.

As used herein, a "chelating agent" refer to a chemical that can form two or more bonds to a single metal atom or metal ion.

As used herein, a "bidentate ligand" refers to a chelating agent that can form two bonds to a single metal atom or metal ion.

As used herein, a "metal chelate additive" is an additive that includes at least one bidentate ligand and a metal atom or metal ion.

As used herein, the term "surfactant" refers to molecules that absorb at the air/water, oil/water and/or oil/water interfaces, substantially reducing their surface energy. Surfactants generally are classified depending on the charge of the surface active moiety, and can be categorized as cationic, anionic, nonionic and amphoteric surfactants.

As used herein, a "thin film composite membrane" refers to a membrane that has layers of dissimilar materials joined together to form a single membrane.

As used herein, "halogenated" refers to the presence of one or more halogen substituents, such as fluorine, chlorine, bromine, or iodine or any combination thereof. For example, a halogenated $C_1$ alkyl can be any of —$CH_2Cl$, —$CHCl_2$, —$CCl_3$, —$CH_2F$, —$CHF_2$, —$CF_3$, —$CH_2Br$, —$CHBr_2$, —$CBr_3$, —$CH_2I$, —$CHI_2$, or —$Cl_3$.

As used herein, the term "contacting" refers to bringing two or more materials into close enough proximity whereby they can interact.

As used herein, "dialkyl sulfoxide" refers to the compound of the structure:

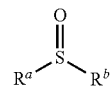

where each of $R^a$ and $R^b$ independently is an alkyl or hydroxyalkyl.

As used herein, "DMSO" refers to dimethyl sulfoxide.
As used herein, "gfd" refers to gallons/ft$^2$/day.

B. Reverse Osmosis

Reference will now be made in detail to an embodiment of the present invention, example of which is illustrated in the accompanying drawings.

The desalination industry faces the problem of achieving high salt rejecting and high flux membranes, particularly those that can function for brackish water at lower pressures, such as 150 psi or less (low energy conditions). These membranes need to have a high salt rejection for low salinity water, be stable over long periods of time (e.g., for at least one week of flat sheet testing in the laboratory), and have high flux to work successfully under low energy brackish water conditions. The processes provided herein produce membranes that achieve a high flux and high salt rejection under low energy brackish water conditions (e.g., 150 psi, 2,000 ppm salinity), and the membrane is stable for at least one week of flat sheet testing in the laboratory. The processes provided herein use a combination of a metal chelate additive containing a bidentate ligand and a metal atom or metal ion and a dialkyl sulfoxide to enhance the polyamide membrane to increase flux with negligent negative impact on salt rejection. The flux enhancing combination provided herein, which includes a metal chelate additive containing a bidentate ligand and a metal atom or metal ion and a dialkyl sulfoxide, increases the flux of the membrane more than either component alone modifies the flux of the membrane.

Dimethyl sulfoxide (DMSO) is a dialkyl sulfoxide. DMSO previously has been tested as a flux enhancement agent in reverse osmosis membranes prepared using n-hexane as a solvent (see Kwak et al., Environ. Sci. Technol. (2001) 35: 4334-4340; Gohil et al., Desalination and Water Treatment (2014) 52: 28-30, 5219-5228, DOI: 10.1080/19443994.2013.809025; and Kim et al., Environ. Sci. Technol. (2005) 39: 1764-1770). Such membranes were designed for use in standard brackish water conditions (2,000 ppm salinity and 225 psi). Diketonates and metal additives are described as capable of increasing flux in reverse osmosis membranes (see e.g., U.S. Pat. No. 8,177, 978).

C. Flux Enhancing Combination

Provided herein is a combination of additives that includes a dialkyl sulfoxide and a metal chelate additive containing a bidentate ligand and a metal atom or metal ion that when included, in the aqueous phase or the organic phase or both, results in the formation of a discrimination layer with increased flux and salt rejection. The flux enhancing combination provided herein results in a synergistic flux enhancement—the enhancement in flux is much greater than that achievable by either additive alone. Membranes prepared using the methods provided herein, which include adding a combination of additives that includes a dialkyl sulfoxide and a metal chelate additive containing a bidentate ligand and a metal atom or metal ion to the aqueous phase or the organic phase or both, can be used under standard brackish water conditions (2,000 ppm salinity and 225 psi) as well as under brackish water conditions at low energy (2,000 ppm and 150 psi). Membranes prepared using the methods provided herein also can be used with seawater and up to pressures of 800 psi. The membranes also can be used for tap water filtration where the pressures can be 150 psi or less, or 100 psi or less, such as from about 25 to about 75 psi. The membranes also can be used for nanofiltration.

The components of the combination can be added together to one phase, e.g., both can be added to the aqueous phase or both can be added to the organic phase, or the components can separately be added to the different phases. For example, in some embodiments, the dialkyl sulfoxide and the metal chelate additive containing a bidentate ligand and a metal atom or metal ion both are added to the aqueous phase. In some embodiments, the dialkyl sulfoxide and the metal chelate additive containing a bidentate ligand and a metal atom or metal ion both are added to the organic phase. In some embodiments, the dialkyl sulfoxide and the metal chelate additive containing a bidentate ligand and a metal atom or metal ion both are added to the aqueous phase and the organic phase. In some embodiments, the dialkyl sulfoxide is added to the aqueous phase and the metal chelate additive containing a bidentate ligand and a metal atom or metal ion is added to the organic phase. In some embodiments, the dialkyl sulfoxide is added to the organic phase and the metal chelate additive containing a bidentate ligand and a metal atom or metal ion is added to the aqueous phase.

1. Dialkyl Sulfoxide

The combination of flux enhancing additives provided herein includes a dialkyl sulfoxide. The dialkyl sulfoxide can be of the formula:

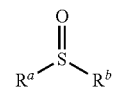

where each of $R^a$ and $R^b$ independently is selected from among a $C_1$-$C_{25}$ alkyl and a $C_1$-$C_{20}$ hydroxyalkyl. The alkyl or hydroxyalkyl can be linear or branched, and when C3 or larger can be a cyclic. In some embodiments, each of $R^a$ and $R^b$ independently is selected from among a $C_1$-$C_{10}$ alkyl and a $C_1$-$C_{10}$ hydroxyalkyl. In some embodiments, each of $R^a$ and $R^b$ independently is selected from among a $C_1$ alkyl, $C_2$ alkyl, $C_3$ alkyl, $C_4$ alkyl, $C_5$ alkyl and $C_6$ alkyl. Exemplary sulfoxides include, but are not limited to, dimethyl sulfoxide, diethyl sulfoxide, methyl ethyl sulfoxide, dipropyl sulfoxide, diisopropyl sulfoxide, di-n-pentyl sulfoxide, di-n-hexyl sulfoxide, di-(2-methyl-pentyl)sulfoxide, dioctyl sulfoxide, methyl octyl sulfoxide, ethyl octyl sulfoxide, 2-hydroxyethyl hexyl sulfoxide, 2-hydroxyethyl heptyl sulfoxide, 2-hydroxy-ethyl octyl sulfoxide, 2-hydroxyethyl nonyl sulfoxide, 2-hydroxyethyl decyl sulfoxide, 2-hydroxy-ethyl undecyl sulfoxide, 2-hydroxyethyl dodecyl sulfoxide, 2-hydroxyethyl tridecyl sulfoxide, 2-hydroxyethyl tetradecyl sulfoxide, 2-hydroxyethyl pentadecyl sulfoxide, 2-hydroxyethyl hexadecyl sulfoxide, 2-hydroxyethyl heptadecyl sulfoxide, 2-hydroxyethyl octadecyl sulfoxide, 2-hydroxyethyl nondecyl sulfoxide, 2-hydroxyethyl, eicosyl sulfoxide, 2-hydroxyethyl heneicosyl sulfoxide, 2-hydroxyethyl docosyl sulfoxide, 2-hydroxypropyl hexyl sulfoxide, 2-hydroxypropyl heptyl sulfoxide, 2-hydroxypropyl octyl sulfoxide, 2-hydroxypropyl nonyl sulfoxide, 2-hydroxypropyl decyl sulfoxide, 2-hydroxypropyl undecyl sulfoxide, 2-hydroxypropyl dodecyl sulfoxide, 2-hydroxypropyl tridecyl sulfoxide, 2-hydroxypropyl tetradecyl sulfoxide, 2-hydroxypropyl pentadecyl sulfoxide, 2-hydroxypropyl hexadecyl sulfoxide, 2-hydroxypropyl heptadecyl sulfoxide, 2-hydroxypropyl octadecyl sulfoxide, 2-hydroxypropyl nondecyl sulfoxide, 2-hydroxypropyl eicosyl, sulfoxide, 2-hydroxypropyl heneicosyl sulfoxide, 2-hydroxypropyl docosyl sulfoxide, 3-hydroxypropyl hexyl sulfoxide, 3-hydroxypropyl dodecyl sulfoxide, 3-hydroxypropyl hexadecyl sulfoxide, 2-hydroxy-2-methyl-propyl dodecyl sulfoxide, 2-hydroxy-2-methyl-dodecyl dodecyl sulfoxide, 2-hydroxy-2-octyl-dodecyl dodecyl sulfoxide, bis(2-hydroxyethyl) sulfoxide, bis(2-hydroxydodecyl) sulfoxide, 2-hydroxy-ethyl 2-hydroxypropyl sulfoxide, 2-hydroxyethyl 2-hydroxy-dodecyl sulfoxide, 2-hydroxyethyl, 5-hydroxypentyl sulfoxide, 2-hydroxycyclohexyl dodecyl sulfoxide, 2-hydroxy-cyclohexyl dodecyl sulfoxide, dicyclohexyl sulfoxide, cyclopentyl methyl sulfoxide, cyclopentyl ethyl sulfoxide, and cycloheptyl propyl sulfoxide, and combinations thereof. A mixture of two or more sulfoxides can be used.

In some embodiments, at least one of $R^a$ and $R^b$ is a $C_1$-$C_{25}$ alkyl. In some embodiments, at least one of $R^a$ and $R^b$ is a $C_1$-$C_{20}$ hydroxyalkyl. In some embodiments, each of $R^a$ and $R^b$ is a $C_1$-$C_{25}$ alkyl. In some embodiments, at least one of $R^a$ and $R^b$ is a $C_1$-$C_{10}$ alkyl. In some embodiments, each of $R^a$ and $R^b$ is a $C_1$-$C_{10}$ alkyl. In some embodiments, the dialkyl sulfoxide is a di-($C_1$-$C_6$-alkyl)-sulfoxide. In some embodiments, dimethylsulfoxide and diethyl sulfoxide are preferred.

Various methods are known for the preparation of sulfoxides. For example, see U.S. Pat. Nos. 6,437,189 B1 and 7,064,214 B2. One method involves oxidation of the corresponding sulfides. The reaction can be carried out in an organic, solvent medium; such as, acetic acid, acetone or methanol. A near theoretical amount of oxidizing agent generally is added to the reaction mixture, usually at temperatures in the range of about 0° C. to 200° C. Hydrogen peroxide often is used as an oxidizing agent; however, other reagents, such as any of the peracids, nitric acid, chromic acid, and potassium permanganate, can be used. The resulting sulfoxide can be recovered from the reaction mixture, usually by dissolving or extracting it in a suitable solvent. The sulfoxide further can be purified by crystallization.

Dimethyl sulfoxide (DMSO) previously has been included in the aqueous phase during interfacial polymerization of the discrimination layer when n-hexane was used as a solvent to increase flux without negatively impacting salt rejection (see Gohil et al., Desalination and Water Treatment (2014) 52: 28-30, 5219-5228, DOI: 10.1080/19443994.2013.809025); Kwak et al., Environ. Sci. Technol. (2001) 35: 4334-4340; and Kim et al., Environ. Sci. Technol. (2005) 39: 1764-1770). There have been a number of theories how DMSO increases flux. For example, Kim et al. (Environ. Sci. Technol. (2005) 39: 1764-1770) states that surface roughness and the surface area increases when DMSO is included in the aqueous phase. Kim et al states that DMSO reduces the difference in solubility between the aqueous phase layer and the organic phase layer, facilitating diffusion of ingredients in the aqueous phase into the organic phase. Gohil et al. (Desalination and Water Treatment (2014) 52: 28-30, 5219-5228, DOI: 10.1080/19443994.2013.809025) suggests that DMSO causes increases in the size and number of network pores and the size of aggregate pores. Kwak et al. (Environ. Sci. Technol. (2001) 35: 4334-4340) states that including DMSO in the aqueous phase results in an enlarged surface area and increases the roughness of the surface, the combination of which allows the membrane to interact with more water molecules, which can account for the higher permeability. Any combination of these effects, combined with the effects achieved by addition of a metal chelate additive containing a bidentate ligand and a metal atom or metal ion, results in a membrane having a high flux and high salt rejection under low energy brackish water conditions.

The dialkyl sulfoxide generally is present in the flux enhancing combination provided herein in an amount that when the combination is added to the aqueous phase or the organic phase results in a concentration of dialkyl sulfoxide in the aqueous phase or organic phase of from about 0.5 wt % to about 5 wt %, (based on the weight of the aqueous phase or organic phase). In some embodiments, the amount of dialkyl sulfoxide, e.g., DMSO, present in the combination results in a concentration of dialkyl sulfoxide in the aqueous phase or the organic phase of from about 1 wt % to 4.25 wt % based on the weight of the aqueous phase. The amount of dialkyl sulfoxide in the combination can be selected to yield a concentration in the aqueous phase or the organic phase of about 0.5 wt %, 0.75 wt %, 1 wt %, 1.25 wt %, 1.5 wt %, 1.75 wt %, 2 wt %, 2.25 wt %, 2.5 wt %, 2.75 wt %, 3 wt %, 3.25 wt %, 3.5 wt %, 3.75 wt %, 4 wt %, 4.25 wt %, 4.5 wt %, 4.75 wt % or 5 wt % based on the weight of the aqueous phase or organic phase, or that results in a concentration in the aqueous phase or the organic phase in a range of at or about a to at or about b, where a is any one of the preceding wt % values of dialkyl sulfoxide, and b is any one of the preceding wt % values of dialkyl sulfoxide that is >a, such as from about 0.5 wt % to about 4 wt %, or from about 1 wt % to about 4.5 wt %, or from about 0.75 wt % to about 3.75 wt %, etc.

The ratio of dialkyl sulfoxide to metal chelate additive containing a bidentate ligand and a metal atom or metal ion in the flux enhancing combination can be from about 5:1 to about 200:1. In some embodiments, the ratio of dialkyl sulfoxide to metal chelate additive is from about 10:1 to about 100:1. In some embodiments, the ratio of dialkyl sulfoxide to metal chelate additive is from about 20:1 to about 70:1. In some embodiments, the ratio of dialkyl sulfoxide to metal chelate additive is 20:1, 21:1, 22:1, 23:1, 24:1, 25:1, 26:1, 27:1, 28:1, 29:1, 30:1, 31:1, 32:1, 33:1, 34:1, 35:1, 36:1, 37:1, 38:1, 39:1, 40:1, 41:1, 42:1, 43:1, 44:1, 45:1, 46:1, 47:1, 48:1, 49:1, 50:1, 51:1, 52:1, 53:1, 54:1, 55:1, 56:1, 57:1, 58:1, 59:1, 60:1, 61:1, 62:1, 63:1, 64:1, 65:1, 66:1, 67:1, 68:1, 69:1, or 70:1.

Adding a dialkyl sulfoxide alone to the aqueous phase can result in a membrane with increased flux. The flux increase achieved, however, is not as much as achieved in a membrane prepared using an aqueous phase or organic phase or both that contains a combination of flux additives that includes a dialkyl sulfoxide and a metal chelate additive that contains a bidentate ligand and a metal atom or metal ion. Further, membranes prepared using a dialkyl sulfoxide alone in the aqueous phase exhibit a greater reduction in salt rejection values than do membranes prepared using a combination of flux additives that includes a dialkyl sulfoxide and a metal chelate additive that contains a bidentate ligand and a metal atom or metal ion in the aqueous phase. In some embodiments, in addition the combination of flux additives that includes a dialkyl sulfoxide and a metal chelate additive that contains a bidentate ligand and a metal atom or metal ion, the aqueous phase includes m-phenyldiamine (MPD), sodium lauryl sulfate (SLS), and triethylamine camphorsulfonic acid (TEACSA). In some embodiments, the aqueous phase or the organic phase or both the aqueous phase and the organic phase also can include hexamethyl-phosphoramide (HMPA). The amount of HMPA in the organic phase or the aqueous phase can be from about 0.05 wt % to about 5 wt %. In some embodiments, the HMPA can be present in either phase in the range from about 0.1 wt % to about 4 wt %.

In some embodiments, the aqueous phase includes m-phenyldiamine (MPD), sodium lauryl sulfate (SLS), hexamethyl-phosphoramide (HMPA) and triethylamine camphorsulfonic acid (TEACSA), and the organic phase includes trimesoyl chloride (TMC) and mesitylene in Isopar™ G (petroleum naphtha, low odor, low aromatic $C_{10}$-$C_{12}$ isoalkanes solvent, ExxonMobil, Irving, Tex.). The membranes prepared using the methods provided herein, prepared with a combination of flux additives that includes a dialkyl sulfoxide and a metal chelate additive that contains a bidentate ligand and a metal atom or metal ion in the aqueous phase or organic phase or both, can be used for standard brackish water filtration (which usually uses pressures of about 225 psi). The membranes prepared using the methods provided herein also can be used in low pressure brackish water filtration (150 psi). In some applications, the salt rejection values are higher in membranes when used at lower pressure (150 psi) than when used at higher pressure. In some applications, the membranes prepared using the methods provided herein can be used in seawater reverse osmosis applications. In some applications, the membranes can be used for tap water filtration or nanofiltration.

2. Metal Chelate Additive

The combination of flux enhancing additives provided herein includes a metal chelate additive containing a bidentate ligand and a metal atom or metal ion. Any bidentate ligand that can form a complex with a metal atom or metal ion can be used in the metal chelate additive. A bidentate ligand can be a Lewis base that can donate electrons to a metal atom or metal ion. Exemplary bidentate ligands include:

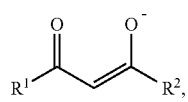
Formula 1

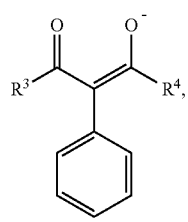
Formula 2

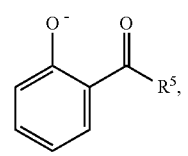
Formula 3

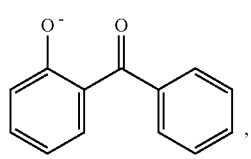
Formula 4

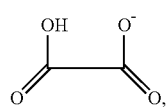
Formula 5

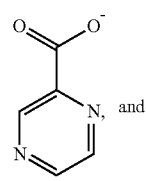
Formula 6

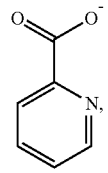
Formula 7 where each of $R^1$, $R^2$, $R^3$, $R^4$ and $R^5$ separately is selected from among a $C_1$-$C_{10}$ alkyl, a halogenated $C_1$-$C_{10}$ alkyl, a 5-membered or 6-membered aromatic ring, an aromatic bicyclic ring system containing two fused 6-membered rings, and an aromatic bicyclic ring system containing a 5-membered ring fused to a 6-membered aromatic ring. In some embodiments, each of $R^1$, $R^2$, $R^3$, $R^4$ and $R^5$ separately is selected from among $C_1$-$C_6$ alkyl and halogenated $C_1$-$C_6$ alkyl. In some embodiments, any one of $R^1$, $R^2$, $R^3$, $R^4$ or $R^5$ can be selected from among phenyl, benzyl, a $C_1$-$C_5$ aromatic ring containing 1 to 4 hetero atoms selected from among N, O and S, and a $C_5$-$C_9$ bicyclic aromatic ring system containing 1 to 4 hetero atoms selected from among N, O and S. In some embodiments, any one of $R^1$, $R^2$, $R^3$, $R^4$ or $R^5$ can be selected from among furanyl, pyrrolyl, thiopheneyl, imidazolyl, pyrazolyl, oxazolyl, isoxazolyl, thiazolyl, phenyl, pyridinyl, pyrazinyl, pyrimidinyl, pyridazinyl, purinyl, benzoxazolyl, benzothiazolyl, benzisoxazolyl, benzimidazolyl, benzothiopheneyl, indazolyl, benzo[c]thiopheneyl, isoindolyl, isobenzofuranyl, naphthaleneyl, quinolinyl, quinoxalinyl, quinazaolinyl, and isoquinolinyl.

Among the preferred bidentate ligands are the unsubstituted and halogen-substituted beta-diketonates of Formula 1, such as an acetylacetonate ion (often abbreviated as "acac" and also known as pentane-2,4-dionate) or halogenated acetylacetonate ion. One or more bidentate ligands can interact with a metal ion to form a metal chelate. For example, when the metal ion is an alkaline earth metal, two bidentate ligands can interact with the metal atom or metal ion to form a metal chelate. Exemplary metal chelate additives include i) two acetylacetonate ligands and a Sr atom (Structure A); ii) two fluoroacetylacetonate ligands and a Sr atom (Structure B); and iii) two oxalate ligands and a Sr atom (Structure C):

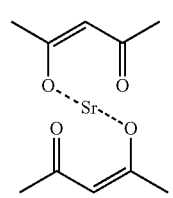
Structure A

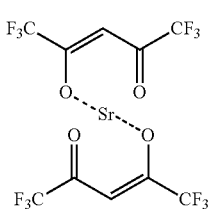
Structure B

-continued

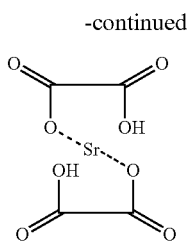

Structure C

In some embodiments, the metal species and the ligands are selected to form a chelate that is dissolvable to some extent in the aqueous phase layer. In some applications, the chelate includes at least one bidentate ligand.

In some embodiments, the metal complex includes an unsubstituted or halogen-substituted beta-diketonate. Exemplary beta-diketonate ligands include pentane-2,4-dionate (acetylacetonate, often abbreviated as "acac"), 1,5-difluoropentane-2,4-dionate, 1,1,5,5-tetrafluoropentane-2,4-dionate, 1,1,1,5,5,5-hexafluoro-pentane-2,4-dionate, propane-1,3-dionate, butane-1,3-dionate, 4-fluorobutane-1,3-dionate, 4,4-difluorobutane-1,3-dionate, 4,4,4-trifluorobutane-1,3-dionate, heptane-3,5-dionate, 1-fluorohexane-2,4-dionate, 1,5-difluoropentane-2,4-dionate, 1,1,5-trifluoropentane-2,4-dionate, 1,1,5,5-tetrafluoro-pentane-2,4-dionate, 1,1,1,5,5-pentafluoropentane-2,4-dionate, 1,1,1,5,5,5-hexafluoropentane-2,4-dionate and octane-3,5-dionate ligands.

The ligand can be bound to any element selected from Groups 2-15 of the Periodic Table (IUPAC) to form the chelate. In some embodiments, the ligand is bound to an element selected from among Groups 3-15 and Rows 3-6 of the Periodic Table (IUPAC), preferably Groups 3-14 and Rows 3-6 of the Periodic Table. In some embodiments, the ligand is bound to a metal atom or metal ion selected from the group consisting of aluminum, beryllium, cadmium, calcium, cerium, chromium, cobalt, copper, dysprosium, erbium, gallium, hafnium, indium, iron, lithium, magnesium, manganese, molybdenum, neodymium, nickel, palladium, potassium, praseodymium, ruthenium, samarium, scandium, sodium, strontium, terbium, tin, vanadium, yttrium, ytterbium, zinc and zirconium. In some embodiments, the metal atom or metal ion can be a Group 2 (alkaline earth, such as beryllium (Be), magnesium (Mg), calcium (Ca), strontium (Sr), and barium (Ba)), or Group 13 (aluminum (Al), gallium (Ga), indium (In) or thallium (Tl)) metal ion or metal atom.

Metal chelates containing bidentate ligands and metal atoms or metal ions are known in the art, as are methods for forming the metal chelates (e.g., see U.S. Pat. Nos. 3,231,597; 3,291,660; and 7,282,573; and international patent application published as WO 2004/056737, the disclosures of each of which are incorporated by reference). For example, metal acetylacetonates can be formed by the reaction of excess acetylacetone or a solution of a solid salt of it in an inert solvent followed by refluxing with the metal oxide, hydroxide, carbonate or basic carbonate of the metal. Metal acetylacetonates also can be prepared in nonaqueous solution by the reaction of metal salt and acetylacetone if the metal salts are soluble in the nonaqueous solvent. Metal acetylacetonates also can be formed by the reaction of acetylacetone with a metal oxide, hydroxide, carbonate or basic carbonate in aqueous solution, with or with pH control or added heat. Metal acetylacetonates also can be prepared in an anhydrous inert medium containing the ligand and metal, particularly alkali metals and alkaline earth metals.

Any of these synthesis techniques can be used to prepare the metal chelates of the flux enhancing combinations provided herein.

The amount of metal atom or metal ion in the metal chelate additive can be selected to yield a concentration in the aqueous phase or the organic phase of from about 0.00001 wt % to about 1 wt %, based on the weight of the aqueous phase or organic phase. In some embodiments, the amount of metal atom or metal ion in the metal chelate additive can be selected to yield a concentration in the aqueous phase or the organic phase of from about 0.0001 wt % to about 1 wt %, or 0.001 wt % to about 0.5 wt %, based on the weight of the aqueous phase or organic phase.

In some embodiments, preferred species of metal chelate additive containing a bidentate ligand and a metal atom or metal ion include $Al(acac)_3$, $Al(F6acac)_3$, $Ba(acac)_2$, $Ba(F6acac)_2$, $Be(acac)_2$, $Be(F6acac)_2$, $Ca(acac)_2$, $Ca(F6acac)_2$, $Cd(acac)_2$, $Cd(F6acac)_2$, $Ce(acac)_3$, $Ce(F6acac)_3$, $Cr(acac)_3$, $Co(acac)_3$, $Cu(acac)_2$, $Cu(F6acac)_2$, $Dy(acac)_3$, $Er(acac)_3$, $Fe(acac)_2$, $Fe(acac)_3$, $Ga(acac)_3$, $Hf(acac)_4$, $In(acac)_3$, $K(acac)$, $Li(acac)$, $Mg(acac)_2$, $Mg(F6acac)_2$, $Mn(acac)_2$, $Mn(acac)_3$, $MoO_2(acac)_2$, $MoO_2(F6acac)_2$, $Na(acac)$, $Nd(acac)_3$, $Nd(F6acac)_3$, $Ni(acac)_2$, $Ni(F6acac)_2$, $Pd(acac)_2$, $Pr(acac)_3$, $Pr(F6acac)_3$, $Ru(acac)_3$, $Ru(F6acac)_3$, $Sc(acac)_2$, $Sc(F6acac)_2$, $Sm(acac)_3$, $Sn(acac)_2$, $Sn(acac)_2Cl_2$, t-butyl-$Sn(acac)_2$, t-butyl-$Sn(acac)_2Cl_2$, $Sn(F6acac)_2$, $Sr(acac)_2$, $Sr(F6acac)_2$, $Tb(acac)_3$, $V(acac)_3$, $Y(acac)_3$, $Y(F6acac)_3$, $Zn(acac)_2$, $Zn(F6acac)_2$, and $Zr(acac)_4$, where F6acac refers to 1,1,1,5,5,5-hexafluoropentane-2,4-dionate or 1,1,1,5,5,5-hexafluoroacetyl-acetonate.

The amount of metal chelate additive containing a bidentate ligand and a metal atom or metal ion in the flux enhancing combination provided herein can be selected to yield a concentration in the aqueous phase or organic phase of from about 0.001 wt % to about 1 wt %, based on the weight of the aqueous phase or organic phase. In some embodiments, the amount of metal chelate additive containing a bidentate ligand and a metal atom or metal ion in the combination can be selected to yield a concentration in the aqueous phase or organic phase of about 0.001 wt %, 0.005 wt %, 0.01 wt %, 0.0125 wt %, 0.015 wt %, 0.0175 wt %, 0.02 wt %, 0.0225 wt %, 0.025 wt %, 0.0275 wt %, 0.03 wt %, 0.0325 wt %, 0.035 wt %, 0.0375 wt %, 0.04 wt %, 0.0425 wt %, 0.045 wt %, 0.0475 wt %, 0.05 wt %, 0.0525 wt %, 0.055 wt %, 0.0575 wt %, 0.06 wt %, 0.0625 wt %, 0.065 wt %, 0.0675 wt %, 0.07 wt %, 0.0725 wt %, 0.075 wt %, 0.0775 wt %, 0.08 wt %, 0.0825 wt %, 0.085 wt %, 0.0875 wt %, 0.09 wt %, 0.0925 wt %, 0.095 wt %, 0.0975 wt %, 0.1 wt %, 0.2 wt %, 0.3 wt %, 0.4 wt %, 0.5 wt %, 0.6 wt %, 0.7 wt %, 0.8 wt %, 0.9 wt % or 1 wt %, based on the weight of the aqueous phase or organic phase, or that results in a concentration in the aqueous phase or organic phase in a range of at or about c to at or about d, where c is any one of the preceding wt % values of metal chelate additive, and d is any one of the preceding wt % values of metal chelate additive that is >c, such as from about 0.005 wt % to about 0.0625 wt %, or from about 0.025 wt % to about 0.575 wt %, or from about 0.01 wt % to about 0.07 wt %, or from about 0.04 wt % to about 0.4 wt %, etc. In some embodiments, at least 0.01 wt % metal chelate additive containing a bidentate ligand and a metal atom or metal ion is present in the aqueous phase. In some embodiments, at least 0.05 wt % metal chelate additive containing a bidentate ligand and a metal atom or metal ion is present in the aqueous phase. In some embodiments, at least 0.01 wt % metal chelate additive containing a bidentate ligand and a metal atom or metal ion is present in the organic phase. In some embodiments, at least 0.05 wt % metal chelate additive containing a bidentate ligand and a metal atom or metal ion is present in the organic phase.

The ratio of metal chelate additive containing a bidentate ligand and a metal atom or metal ion to dialkyl sulfoxide in the flux enhancing combination provided herein can be from about 1:5 to about 1:200. In some embodiments, the ratio of metal chelate additive containing a bidentate ligand and a metal atom or metal ion to dialkyl sulfoxide is from about 1:10 to about 1:100. In some embodiments, the ratio of metal chelate additive to dialkyl sulfoxide is from about 1:20 to about 1:70. In some embodiments, the ratio of metal chelate additive to dialkyl sulfoxide is 1:20, 1:21, 1:22, 1:23, 1:24, 1:25, 1:26, 1:27, 1:28, 1:29, 1:30, 1:31, 1:32, 1:33, 1:34, 1:35, 1:36, 1:37, 1:38, 1:39, 1:40, 1:41, 1:42, 1:43, 1:44, 1:45, 1:46, 1:47, 1:48, 1:49, 1:50, 1:51, 1:52, 1:53, 1:54, 1:55, 1:56, 1:57, 1:58, 1:59, 1:60, 1:61, 1:62, 1:63, 1:64, 1:65, 1:66, 1:67, 1:68, 1:69, or 1:70.

The combination containing dialkyl sulfoxide and a metal chelate additive containing a bidentate ligand and a metal atom or metal ion can be added to the aqueous phase or the organic phase or both. The dialkyl sulfoxide and the metal chelate additive can be added in combination or sequentially in any order.

D. Other Additives

In the processes provided herein, the aqueous phase or organic phase used during interfacial polymerization can include other additives in addition to the flux enhancing combination containing dialkyl sulfoxide and a metal chelate additive containing a bidentate ligand and a metal atom or metal ion described herein. For example, the aqueous phase can include nanoparticles, carriers including insoluble carriers, and processing aids, such as surfactants, co-solvents such as polar aprotic solvents, drying agents, catalysts, co-reactants, or any combination thereof. Drying agents can include, e.g., hydrophobic organic compounds, such as a hydrocarbon or an ether, glycerin, citric acid, glycols, glucose, sucrose, sodium citrate, triethylammonium camphorsulfonate, triethylammonium benzenesulfonate, triethylammonium toluenesulfonate, triethylammonium methane sulfonate, ammonium camphor sulfonate, and ammonium benzene sulfonate and those described in U.S. Pat. Nos. 4,855,048; 4,948,507; 4,983,291; and 5,658,460. Anti-oxidants also can be included in the aqueous phase or organic phase, or both. For example, Irganox® 1010 (a sterically hindered phenolic anti-oxidant, CAS No. 6683-19-8 from BASF Schweiz AG, Basel, Switzerland) can be included in the organic phase. Nanoparticles and non-polar organic solvents also can be included in the organic phase.

1. Nanoparticles

In some embodiments, nanoparticles or carriers can be included in the TFC membrane. The nanoparticles or relatively insoluble carriers or both can be processed using shear, cavitation, or impact forces prior to addition to the aqueous phase or organic phase or both. The nanoparticles or carriers also can be calcined for at least 1 hour at 200° C. or more prior to use. Carriers also can be processed by subjecting them to ultrasonic energy prior to use.

The nanoparticles or carriers can be processed to adjust the pH prior to use. For example, the nanoparticles or carriers or both can be processed in a solution at a pH lower than about 6 for at least 30 seconds or at a pH lower than about 5 for at least 30 seconds. The nanoparticles or carriers can be processed in a solution at a pH greater than about 8 for at least 30 seconds or in a solution at a pH greater than about 9 for at least 30 seconds. The nanoparticles or carriers or both also can be processed with heat in a solution for at least 5 minutes at a temperature of 40° C. or more.

Nanoparticles or carriers can be included in the support layer, the organic phase, the aqueous phase, both the aqueous phase and the organic phase, or in support layer, the aqueous phase and the organic phase. Nanoparticles or carriers also can be present in the water wetted surface of the support membrane prior to interfacial polymerization between the monomers in the aqueous phase and the monomers in the organic phase. Nanoparticles, such as zeolites, particularly LTA, can be added to support membrane to improve functionality, e.g., by making the membrane more resistant to compaction.

Nanoparticles or carriers can include a metal particle, such as gold, silver, copper, zinc, titanium, iron, aluminum, zirconium, indium, tin, magnesium, or calcium or an alloy thereof or an oxide thereof or a combination thereof. They can also be a nonmetallic species such as $Si_3N_4$, SiC, BN, $B_4C$, or TiC or an alloy thereof or a combination thereof. They can be a carbon-based species such as graphite, carbon glass, a carbon cluster of at least $C_2$, a carbon nanotube, a carbon nanoparticle, a buckminster-fullerene, a higher fullerene, or a combination thereof, such as those described in U.S. Pat. Nos. 5,641,466; 6,783,745; 7,078,007; 7,422,667; 7,648.765; 7,816,564; 8,173,211; and 8,828,533.

Suitable zeolites for use as nanoparticles include LTA (Linde Type A), LTL (Linde Type L), OFF (offretite), RHO, PAU, and KFI. Such zeolites have different Si/Al ratios, and exhibit different characteristic charge and hydrophilicity and can therefore be selected to be included in RO membranes in different circumstances. Nanoparticles also can include zeolite precursors or amorphous aluminosilicates.

Zeolites can be crystalline aluminosilicates with fully cross-linked, open framework structures made up of corner-sharing $SiO_4$ and $AlO_4$ tetrahedra. A representative empirical formula of a zeolite is $M_{2/n}O.Al_2O_3xSiO_2yH_2O$ where M represents the exchangeable cation of valence n. M is generally a Group I or II ion, although other metal, non-metal, and organic cations can also balance the negative charge created by the presence of Al in the structure. The framework can contain interconnected cages and channels of discrete size, which can be occupied by water. In addition to $Si^{4+}$ and $Al^{3+}$, other elements can also be present in the zeolitic framework. They need not be isoelectronic with $Si^{4+}$ or $Al^{3+}$, but are able to occupy framework sites. Aluminosilicate zeolites typically display a net negative framework charge, but other molecular sieve frameworks can be electrically neutral.

Aluminosilicate zeolites with a Si:Al ratio less than 1.5:1 are preferred. Other preferred minerals include Aluminite, Alunite, Ammonia Alum, Anauxite, Apjohnite, Basaluminite, Batavite, Bauxite, Beidellite, Boehmite, Cadwaladerite, Cardenite, Chalcoalumite, Chiolite, Chloraluminite, Cryolite, Dawsonite, Diaspore, Dickite, Gearksutite, Gibbsite, Halloysite, Hydrobasaluminite, Hydrocalumite, Hydrotalcite, Illite, Kalinite, Kaolinite, Mellite, Montmorillonite, Natroalunite, Nontronite, Pachnolite, Prehnite, Prosopite, Ralstonite, Ransomite, Saponite, Thomsenolite, Weberite, Woodhouseite, and Zincaluminite and combinations thereof.

Zeolites and other inorganic mineral compounds also can be selected based on the degree of crystallization. Amorphous portions of the nanoparticle are typically more soluble than crystalline portions of the nanoparticle and processing can increase solubility. The amount of crystalline material can be determined through several techniques including x-ray crystallography. The nanoparticles can have a structure with greater than 0.5%, 1% or 5% amorphous material by mass within the particle and may have a surface containing at least 40% of aluminum atoms or oxygen atoms directly bound to aluminum atoms.

Minerals that have cage-like framework structures similar to zeolites or have similar properties include the phosphates: kehoeite, pahasapaite and tiptopite; and the silicates: hsianghualite, lovdarite, viseite, partheite, prehnite, roggianite, apophyllite, gyrolite, maricopaite, okenite, tacharanite and tobermorite. Accordingly, minerals similar to zeolites also can be molecular sieves based on $AlPO_4$. These aluminophosphates, silicoalumino-phosphates, metalloalumino-phosphates and metallosilicoalumino-phosphates are denoted as $AlPO_{4-n}$, $SAPO_{-n}$, $MeAPO_{-n}$ and $MeAPSO_{-n}$, respectively, where n is an integer indicating the structure type. $AlPO_4$ molecular sieves can have the structure of known zeolites or other structures. When Si is incorporated in an $AlPO_{4-n}$ framework, the product can be known as SAPO. MeAPO or MeAPSO sieves are can be formed by the incorporation of a metal atom (Me) into an $AlPO_{4-n}$ or SAPO framework. Exemplary metal atoms include Li, Be, Mg, Co, Fe, Mn, Zn, B, Ga, Fe, Ge, Ti, and As.

Most substituted $AlPO_{4-n}$'s have the same structure as $AlPO_{4-n}$, but several new structures are only found in SAPO, MeAPO and MeAPSO materials. Their frameworks typically carry an electric charge.

Non-zeolite nanoparticles and or other relatively insoluble carriers can be selected from a list of inorganic mineral compounds that have a solubility product such that preferred concentrations of dissolved molecular additives can be achieved. For many compounds, these solubility products ($K_{sp}$) are well known. For compounds where these are not known experimentally, molecular additive releasing or other relatively insoluble carriers also can be selectable by their counter ion. In such cases, compounds can be selected based on the presence of sulfate, hydroxide or oxide counter-ions. Solubility of these non-zeolite nanoparticles or other relatively insoluble carriers can be enhanced using processing.

Particle size is often described in terms of average hydrodynamic diameter, assuming a spherical shape of the nanoparticles or carriers. The nanoparticle carrier can have an average hydrodynamic diameter of from about 0.1 nm to about 1000 nm, from about 10 nm to about 1000 nm, from about 20 nm to about 1000 nm, from about 50 nm to about 1000 nm, from about 0.11 nm to about 500 nm, from about 10 nm to about 500 nm, from about 50 nm to about 250 nm, from about 200 nm to about 300 nm, or from about 50 nm to about 500 nm.

The nanoparticles or carriers can be dispersed in a solution compatible with the aqueous or polar solvent that will be used during interfacial polymerization. In some applications, water can be used as both the dispersion solvent for the nanoparticles or carriers and as the aqueous solvent for use during the interfacial polymerization. This dispersion largely includes isolated and individual nanoparticles or carriers. Suitable methods for dispersion include stirring, ultrasonication, shaking, use of surfactants or co-solvents, use of a Microfluidizer™ high shear fluid processors (Microfluidics Corp., Westwood, Mass., USA), use of a homogenizer, use of a mortar and pestle, use of a ball mill or use of a jar mill. In some applications, some of the nanoparticles or carriers may still be associated with other nanoparticles or carrier particles as aggregates. These aggregates can be left in solution, or can removed by a suitable technique, such as filtration.

When present, the amount of nanoparticles in the aqueous phase or organic phase is from about 0.001 wt % to about 0.5 wt % based on the weight of the aqueous phase or organic phase. In some embodiments, the aqueous phase or organic phase contains an amount of nanoparticles from about 0.005 wt % to about 0.1 wt % based on the weight of the aqueous phase or organic phase.

2. Processing Aids

In some embodiments, the aqueous phase or organic phase can include processing aids, such as surfactants, co-solvents such as polar aprotic solvents in the aqueous phase or non-polar organic solvents in the organic phase, drying agents, catalysts, co-reactants, or any combination thereof. When present, a processing aid can be present in the aqueous phase or organic phase in an amount from about 0.001 wt % to about 10 wt % based on the weight of the aqueous phase or organic phase.

a. Surfactants

In some embodiments, the aqueous phase used during interfacial polymerization can include a surfactant or a combination of surfactants. The surfactants can, e.g., help the aqueous phase wet the support layer or can help in the dispersion of materials, e.g., nanoparticles, in the aqueous phase. The surfactant(s) can be selected from among nonionic, cationic, anionic, and zwitterionic surfactants depending on the chemistry of the other additives. For example, a cationic surfactant would not be selected when anionic additives are being used. Exemplary surfactants include sodium lauryl sulfate (SLS), alkyl ether sulfates, alkyl sulfates, olefin sulfonates, alkyl ether carboxylates, sulfosuccinates, aromatic sulfonates, octylphenol ethoxylates, ethoxylated nonylphenols, alkyl poly(ethylene oxide), copolymers of poly(ethylene oxide) and poly(propylene oxide) (commercially called poloxamers or poloxamines), alkyl polyglucosides, e.g., octyl glucoside or decyl maltoside, fatty alcohols, e.g., cetyl alcohol or oleyl alcohol, cocamide MEA, cocamide DEA, alkyl hydroxyethyl dimethyl ammonium chloride, cetyl-trimethyl ammonium bromide or chloride, hexadecyl-trimethyl ammonium bromide or chloride, and alkyl betaines. Preferred among these are SLS, octylphenol ethoxylates, and ethoxylated nonylphenols.

When present, the amount of surfactant in the aqueous phase can be up to 10 wt %, but generally is less than 5 wt %, often less than 1 wt %, such as from about 0.005 wt % to about 0.5 wt % based on the weight of the aqueous phase. In some embodiments, the aqueous phase contains no surfactant. In some embodiments, the aqueous phase contains an amount of surfactant from about 0.01 wt % to about 0.1 wt % based on the weight of the aqueous phase.

b. Triethylammonium Camphorsulfonate (TEACSA)

In some embodiments, the aqueous phase used during interfacial polymerization can include triethylammonium camphorsulfonate (TEACSA). When present, the TEACSA is present in an amount from about 4 wt % to about 10 wt % based on the weight of the aqueous phase. In some embodiments, the TEACSA is present in the aqueous phase in an amount from about 5 wt % to about 7.5 wt %. In some embodiments, the amount of TEACSA in the aqueous phase is about 4 wt %, 4.25 wt %, 4.5 wt %, 4.75 wt %, 5 wt %, 5.25 wt %, 5.5 wt %, 5.75 wt %, 6 wt %, 6.25 wt %, 6.5 wt %, 6.75 wt %, 7 wt %, 7.25 wt %, 7.5 wt %, 7.75 wt %, 8 wt %, 8.25 wt %, 8.5 wt %, 8.75 wt %, 9 wt %, 9.25 wt %, 9.5 wt %, 9.75 wt %, or 10 wt % based on the weight of the aqueous phase, or an amount in a range of at or about e to at or about f, where e is any one of the preceding wt % values of TEACSA, and f is any one of the preceding wt % values of TEACSA that is >e, such as from about 5 wt % to about 10 wt %, or from about 4.25 wt % to about 7.75 wt %, or from about 5 wt % to about 7 wt %, etc. In some embodiments, the TEACSA is present in the aqueous phase in an amount of about 6.75 wt %.

c. Catalysts

Catalysts can be included in the aqueous phase. In some embodiments, a catalyst can include diethylamine, triethylamine, ethylene diamine, triethanolamine, diethanolamine, ethanolamine, dimethylaminopyridine or combinations thereof. In some embodiments, the catalyst can be an acid catalyst or a base catalyst. An acid catalyst can be an inorganic acid, an organic acid, a Lewis acid, or a quaternary ammonium salt or an acid salt of ammonia or a primary, secondary or tertiary amine. Exemplary acid catalysts include hydrochloric acid, nitric acid, sulfuric acid, an aliphatic sulfonic acid, an aromatic sulfonic acid, a carboxylic acid, a fluorinated carboxylic acid, such as trifluoroacetic acid, a cycloaliphatic sulfonic acid, boric acid, tetrafluoroboric acid, aluminum trihalide, an aluminum trialkoxide, a boron trihalide, such as a boron trifluoride, a tin tetrahalide, such as tin tetrachloride and zinc tetrafluoroborate.

Exemplary base catalysts include alkoxide salts, such as sodium ethoxide; hydroxide salts, such as sodium hydroxide and potassium hydroxide; carbonate salts, such as potassium carbonate; phosphate salts, such as trisodium phosphate; phenoxide salts, such as sodium phenoxide; borate salts, such as sodium borate; carboxylate salts, such as potassium acetate; ammonia; and primary, secondary and tertiary amines.

When present, the amount of catalyst in the aqueous phase is from about 0.001 wt % to about 0.5 wt % based on the weight of the aqueous phase. In some embodiments, the aqueous phase contains an amount of catalyst from about 0.005 wt % to about 0.25 wt % based on the weight of the aqueous phase.

d. Polar Aprotic Solvents

In some embodiments, the aqueous phase used during interfacial polymerization can include one or more polar aprotic solvents. Any polar aprotic solvent compatible with the other components can be selected. Exemplary polar aprotic solvents include dimethylformamide, dimethylacetamide, tetrahydrofuran, hexamethyl phosphoramide (HMPA), 1,3-dimethyl-2-imidazolidinone, diethyl ether, N-methyl-2-pyrrolidinone, dichloromethane, ethyl acetate, methyl acetate, isopropyl acetate, acetone, methyl ethyl ketone, methyl isobutyl ketone, and acetonitrile and mixtures thereof. In some embodiments, the polar aprotic solvent included in the aqueous phase is hexamethyl phosphoramide.

In some embodiments, the amount of polar aprotic solvent included in the aqueous phase is from about 0.05 wt % to about 5 wt %. In some embodiments, the amount of polar aprotic solvent included in the aqueous phase is from about 0.1 wt % to about 1 wt %. In some embodiments, the amount of polar aprotic solvent present in the aqueous phase is about 0.05 wt %, 0.1 wt %, 0.125 wt %, 0.15 wt %, 0.175 wt %, 0.2 0.225 wt %, 0.25 wt %, 0.275 wt %, 0.3 wt %, 0.325 wt %, 0.35 wt %, 0.375 wt %, 0.4 wt %, 0.425 wt %, 0.45 wt %, 0.475 wt %, 0.5 wt %, 0.525 wt %, 0.55 wt %, 0.575 wt %, 0.6 wt %, 0.625 wt %, 0.65 wt %, 0.675 wt %, 0.7 wt %, 0.725 wt %, 0.75 wt %, 0.775 wt %, 0.8 wt %, 0.825 wt %, 0.85 wt %, 0.875 wt %, 0.9 wt %, 0.925 wt %, 0.95 wt %, 0.975 wt %, 1 wt %, 1.5 wt %, 2 wt %, 2.5 wt %, 3 wt %, 3.5 wt %, 4 wt %, 4.5 wt % or 5 wt % based on the weight of the aqueous phase, or an amount in a range of at or about g to at or about h, where g is any one of the preceding wt % values of polar aprotic solvent, and h is any one of the preceding wt % values of polar aprotic solvent that is >g, such as from about 0.15 wt % to about 1.5 wt %, or from about 0.35 wt % to about 3.5 wt %, or from about 0.25 wt % to about 0.75 wt %, etc. In some embodiments, the polar aprotic solvent is hexamethyl phosphoramide and is present in the aqueous phase in an amount of about 0.5 wt %.

Other co-solvents can be included. Examples of other co-solvents include, but are not limited to, ethanol, propanol, isopropanol, butanol, ethylene glycol, propylene glycol, glycerol and mixtures thereof with water, either individually or in any combination thereof. In some embodiments, the total amount of co-solvent present in the aqueous phase is in the range of from about 0.05 wt % to about 10 wt %.

E. Preparation of TFC Membranes

Thin film composite (TFC) membranes can be used, e.g., in reverse osmosis (RO) and forward osmosis (FO) applications, tap water filtration and nanofiltration. For RO applications, the membranes include a support layer, which is preferably porous. The support layer can by hydrophilic or hydrophobic. In some applications, the support layer is hydrophilic. The TFC membrane also includes at least one a discrimination layer on a surface of the support layer. The TFC membrane can include an anti-fouling layer deposited on either or both surfaces of the TFC membrane. The TFC membrane also can include a protective layer deposited on either or both surfaces of the TFC membrane or on an anti-fouling layer. To prevent scratching of the membrane surface or alter adsorption, e.g., a hydrophilic polymer layer can be applied to the surface of the discrimination layer or the anti-fouling layer. For example, a solution of polyvinyl alcohol in water can be applied to the surface of the discrimination layer followed by application of heat to provide a heat cure of the hydrophilic polymer layer.

1. Support Layer

The support layer typically includes a polymeric microporous support membrane, which in turn is often supported by a non-woven or woven mesh fabric to improve handling properties of the membranes or for mechanical strength or both. The support layer can include a polysulfone or other suitably porous membrane, such as a membrane containing polyethersulfone, poly(ether sulfone ketone), poly(ether ethyl ketone), poly(phthalazinone ether sulfone ketone), polyacrylonitrile, polyvinyl chloride, polyester, polystyrene, polysulfone, polypropylene, cellulose nitrate, cellulose acetate, cellulose diacetate, or cellulose triacetate. The support layer typically is about 25 to 250 microns in thickness. The support layer is porous, and often the smallest pores of the support layer are located very near the upper surface. Porosity at the surface can be low, for instance from 5-15%, of the total surface area.

The preparation of the support layer can include spraying or casting a polymer solution onto a woven or non-woven fabric layer. Exemplary processes known in the art to form the support layer are disclosed, e.g., in U.S. Pat. Nos. 3,926,798; 4,039,440; 4,337,154; and 8,177,978; and in U.S. Patent Application Publication Nos. 2011/0174728 and 2014/0014575, the disclosure of each of which is incorporated herein by reference. One or more than one reinforcing fabric layer of a woven or nonwoven material or a combination thereof, and made up of polymeric fibers, can be included in the TFC membrane. When present, the fabric layer preferably is permeable to water, flat, and without stray fibers that could penetrate the support layer or the discrimination layer. The fabric layer generally is thin to decrease cost and to maximize membrane area, is resistant to extensional forces, and is mechanically resistant to deformation at high pressures.

The preparation of the support layer generally includes the addition of N-methylpyrrolidone (NMP) solvent (Acros Organics, Waltham, Mass., USA) to a polysulfone polymer ($M_n$-26,000 ($M_n$ being the number average molecular weight) from Aldrich, USA) in transparent bead form in airtight glass bottles.

Alternatively dimethylformamide (DMF) can be used as the solvent. The mixture then is agitated for several hours until complete dissolution of the polysulfone polymer is achieved, forming a dope or casting solution. The casting solution can be cast or spread over a woven or non-woven mesh fabric layer, which optionally can be attached to glass plate via a knife-edge. In some embodiments, the glass plate with the mesh fabric layer and casting solution can be immediately immersed into demineralized water, which has been maintained at the desired temperature (such as from about 4° C. to about 30° C.). Immediately, phase inversion begins and after several minutes, the woven or non-woven fabric layer supporting the polysulfone membrane can be separated from the glass plate to form the support layer. The support layer then can be washed thoroughly with deionized water and stored in cold conditions until used. In a continuous coating process for production of a support layer (e.g., using equipment and/or a process similar to those described in U.S. Pat. Nos. 4,214,994; 4,277,344; 6,153,133; 7,490,725; and 8,580,341; U.S. Pat. App. Pub. Nos. US2009/0050558A1 and US 2012/0292249A1, and international patent application published as WO 2014/080426 A1, which describe coating processes for continuous preparation of reverse osmosis membranes), a glass plate would not be required. The porous support layer typically is kept wet until use.

The casting solution of the support layer can include additives. For example, the casting solution can include nanoparticles, such as zeolites or carbon nanotubes or spherical fullerenes or a combination thereof, an alkylene glycol, a polyalkylene glycol, N-methyl-2-pyrrolidinone, dimethylacetamide, or any combination of these additives. Exemplary alkylene glycols include ethylene glycol, diethylene glycol, triethylene glycol, propylene glycol, dipropylene glycol, and tripropylene glycol and combinations thereof. Exemplary polyalkylene glycols include a polyethylene glycol (PEG) and a polypropylene glycol. Polyethylene glycols (PEGs) having molecular weights of 400 to 20,000, preferably 600 to 2,000, can be included in the casting solution.

2. Discrimination Layer

At least one a discrimination layer comprising a polyamide is formed on a surface of the support layer, thereby forming a thin film composite membrane. The discrimination layer can be synthesized using an interfacial polymerization process on the porous support membrane. In the synthesis of the discrimination layer, two immiscible solvents generally are used, usually an aqueous phase and an organic phase solution, so that a monomer in one solvent reacts with a monomer in the other solvent to polymerize and form the discrimination layer. The polymerization reactions are very fast and relatively high molecular weight polymers are obtained.

The discrimination layer is a permeable membrane containing any material as long as the discrimination layer allows filtration of a fluid for which filtration is desired. In an exemplary embodiment, the discrimination layer can be a polyamide layer. Although the chemistry of the discrimination layer is not to be viewed as limited, in an exemplary embodiment the polyamide layer can be formed by interfacial polymerization of a polar solution and a non-polar solution. The combination of flux enhancing additives described herein can be added to the polar solution or the non-polar solution or both. An exemplary polar solution can be an aqueous phase containing a polyamine such as m-phenylenediamine (MPD). An exemplary non-polar solution can be an organic phase containing a polyfunctional acid halide such as trimesoyl chloride (TMC).

Discrimination layers prepared by methods and chemistries known in the art, for example, the chemistry and methods of manufacturing discrimination layers that are disclosed in any of U.S. Pat. Nos. 4,277,344; 4,902,424; 5,108,607; 5,543,046; 6,337,018; and 7,109,140, all of which are herein incorporated by reference, often do not exhibit adequate salt rejection and flux after formation on a surface of a support layer to produce a thin film composite membrane. As shown herein, the methods and chemistries known in the art can be modified to include the combination of flux enhancing additives described herein during formation of the discrimination layer, such as by adding the combination of flux enhancing additives described herein to the aqueous phase or organic phase or both, producing thin film composite membranes that exhibit good flux and salt rejection, thereby overcoming the deficiencies of known membranes.

In some embodiments, the discrimination layer generally contains a polyamide formed by the interfacial polymerization between one or more di- or polyfunctional amines and one or more di- or polyfunctional acyl chlorides. The di- or polyfunctional amines can be aromatic and/or aliphatic. The di- or polyfunctional acyl chlorides can be aromatic and/or aliphatic.

Generally, the polymer matrix that forms the discrimination layer can be prepared by reaction of two or more monomers. The first monomer can be a dinucleophilic or a polynucleophilic monomer and the second monomer can be a dielectrophilic or a polyelectrophilic monomer. That is, each monomer can have two or more reactive (e.g., nucleophilic or electrophilic) groups. Both nucleophiles and electrophiles are well known in the art, and one of skill in the art can select suitable monomers for this use. The first and second monomers can also be chosen so as to be capable of undergoing an interfacial polymerization reaction to form a polymer matrix (i.e., a three-dimensional polymer network) when brought into contact. The first and second monomers also can be selected so as to be capable of undergoing a polymerization reaction when brought into contact to form a polymer product that is capable of subsequent crosslinking by, e.g., exposure to heat, light radiation, or a chemical crosslinking agent.

The first monomer can be selected so as to be soluble in a polar liquid, preferably water, to form a polar mixture. Generally, the difunctional or polyfunctional nucleophilic monomer can have primary or secondary amino groups and can be aromatic (e.g., a diaminobenzene, a triaminobenzene, m-phenylenediamine, p-phenylenediamine, 1,3,5-triaminobenzene, 1,3,4-triaminobenzene, 3,5-diamino-benzoic acid, 2,4-diaminotoluene, 2,4-diaminoanisole, and xylylenediamine) or aliphatic (e.g., ethylenediamine, propylenediamine, piperazine, and tris(2-diamino-ethyl)amine). In a yet further example, the polar liquid and the first monomer can be the same compound; that is, the first monomer can be provided and not dissolved in a separate polar liquid.

Examples of suitable amine species include primary aromatic amines having two or three amino groups, e.g., m-phenylene diamine, and secondary aliphatic amines having two amino groups, for example piperazine. In some embodiments, two or more different species of amine monomer can be included in the polar liquid (e.g., aqueous phase) to form a polar mixture. The amine can typically be applied to the microporous support as a solution in a polar liquid, e.g., water. The resulting polar mixture typically includes from about 0.1 wt % to about 20 wt %, preferably from about 0.5 wt % to about 6 wt %, amine. Once coated on a porous support layer, excess polar mixture optionally can be removed. The polar mixture need not be aqueous, but the polar liquid should be immiscible with the a polar liquid. Although water is a preferred solvent, non-aqueous polar solvents can be used, such as acetonitrile, lower monohydric alcohols and ketones. Combinations of water and one or more polar solvents can be used.

In some embodiments, a second monomer can be selected so as to be miscible with the polar liquid forming a polar mixture (i.e., aqueous phase). The second monomer optionally also can be selected so as to be immiscible with a non-polar liquid. The second monomer can be a dinucleophilic or a polynucleophilic monomer. The nucleophilic monomer can contain two or more, for example, three, nucleophilic groups per molecule.

The polar mixture typically can be applied to the porous support layer by dipping, immersing, coating, spraying or any other application techniques. Once coated on the porous support layer, excess polar mixture optionally can be removed by evaporation, drainage, air knife, rubber wiper blade, nip roller, sponge, or other devices or processes.

In some embodiments of the processes provided herein, an aqueous phase containing a combination of flux additives that includes a dialkyl sulfoxide and a metal chelate additive that contains a bidentate ligand and a metal atom or metal ion is applied on a surface of a support layer, and an organic phase layer then is applied, the components of which interact with components of the aqueous phase, and at the interface between these layers polymerization occurs, resulting in formation of a discrimination layer.

The method of forming the discrimination layer on a surface of the porous support layer can include floating the porous support layer on the surface of the aqueous phase, or casting the aqueous phase on a surface of the porous support layer; or spraying the aqueous phase onto a surface of the porous support layer; or immersing the porous support layer in the aqueous phase. In methods that include floating or immersing the porous support in the aqueous phase, the treating time can be varied very widely in a range of from about 1 second to about 24 hours or longer, but such treating time is not critical. The treatment effected once is usually sufficient, but the treatment can be performed twice or more.

Representative conditions for reaction of an amine (e.g., MPD) with an electrophile (e.g., TMC) to form a polyamide thin film composite membrane, include use of a ratio of concentration of MPD to concentration of TMC in the range of from about 10:1 to about 40:1, with the MPD concentration being from about 1 wt % to about 6 wt % of the polar phase (aqueous phase). In some embodiments, the ratio of concentration of MPD to concentration of TMC is about 10:1, or about 11:1, or about 12:1, or about 13:1, or about 14:1, or about 15:1, or about 16:1, or about 17:1, or about 18:1, or about 19:1, or about 20:1, about 21:1, or about 22:1, or about 23:1, or about 24:1, or about 25:1, or about 26:1, or about 27:1, or about 28:1, or about 29:1, or about 30:1, or about 31:1, or about 32:1, or about 33:1, or about 34:1, or about 35:1, or about 36:1, or about 37:1, or about 38:1, or about 39:1, or about 40:1. The polymerization reaction can be carried out at room temperature in an open environment, or the temperature of either the polar or the apolar liquid, or both, can be modulated or controlled, e.g., at a temperature above room temperature (20° C. to 25° C.) or a temperature below room temperature. Once formed, the discrimination layer can act as a barrier to inhibit contact between the reactants and to slow the reaction. The discrimination layer typically is very thin and permeable to water, but relatively impermeable to dissolved, dispersed, or suspended solids, such as salts to be removed from saltwater or brackish water in use to produce purified water.

In some embodiments, the amount of the combination of flux enhancing additives used in the polar phase, e.g., an aqueous phase, or in the organic phase, is selected to yield a ratio of the concentration of MPD to the concentration of dialkyl sulfoxide in the range of from about 1:1 to about 2:1, with the MPD concentration being from about 1 wt % to about 6 wt % of the polar phase or the organic phase. In some embodiments, the range of the ratio of concentration of MPD to the concentration of dialkyl sulfoxide is from about 1.25:1 to about 2:1, or from about 1.25:1 to about 1.75:1, or from about 1.3:1 to about 1.6:1

In some embodiments, the metal chelates can release the metal ion or metal atom, e.g., a Group 2 (alkaline earth, such as Be, Mg, Ca, Sr, and Ba), or Group 13 (aluminum, gallium, indium or thallium) metal ion or metal atom. The metal chelates can be dispersed with the dialkyl sulfoxide in the aqueous phase or organic phase or both. Nanoparticles or carriers or processing aids, such as catalysts, co-reactants, and co-solvents, or any combination thereof also can be present in the aqueous phase or organic phase to modify surface properties or further increase performance, for example to improve fouling resistance. In some embodiments, the processes provided herein include in the polar phase, e.g., an aqueous phase, MPD, TEASCA, SLS or other surfactant, the flux enhancing combination that contains dimethyl sulfoxide and $Sr(acac)_2$ or $Sr(F6acac)_2$ or a combination thereof, and hexamethyl phosphoramide as a polar aprotic solvent.

In some embodiments, a second species of monomer can be selected so as to be miscible with the apolar (organic phase) liquid forming an apolar mixture, although for monomers having sufficient vapor pressure, the monomer optionally can be delivered from a vapor phase. The second monomer optionally also can be selected so as to be immiscible with a polar liquid. Typically, the second monomer can be a dielectrophilic or a polyelectrophilic monomer. The electrophilic monomer can be aromatic in nature and can contain two or more, for example three, electrophilic groups per molecule. The second monomer can be a trimesoyl halide. For the case of acyl halide electrophilic monomers, acyl chlorides are generally more suitable than the corresponding bromides or iodides because of the relatively lower cost and greater availability.

Suitable polyfunctional acyl halides include trimesoyl chloride (TMC), trimellitic acid chloride, isophthaloyl chloride, terephthaloyl chloride and similar compounds or blends of suitable acyl halides. As a further example, the second monomer can be a phthaloyl halide.

The polyfunctional acyl halide can be dissolved in the apolar organic liquid in a range of, for example, from about 0.01 wt % to about 10.0 wt %, or from about 0.03 wt % to about 3 wt % or from about 0.05 wt % to about 5 wt %. Suitable apolar liquids are capable of dissolving the electrophilic monomers (e.g., polyfunctional acyl halides) and are immiscible with a polar liquid (e.g., water). Generally the apolar organic liquid is a water-immiscible solvent that is inactive in the interfacial polymerization, does not form a chemical bond with the halide compound, and does not damage the porous support layer Exemplary apolar organic liquids that can be used to dissolve the acyl halide include aliphatic hydrocarbons, such as $C_8$-$C_{24}$ hydrocarbons and mixtures thereof, such as isoparaffinic solvents such as Isopar™ isoparafinic fluids (e.g., Isopar™ G petroleum naphtha, low odor, low aromatic $C_{10}$-$C_{12}$ isoalkanes solvent, ExxonMobil, Irving, Tex.) and Isane® isoparaffinic solvents (Total Special Fluids, Oudalle, France). The solvent used can be a single solvent or a mixture of solvents.

Additional apolar liquids can be included in the organic phase. For example, an apolar liquid that does not pose a threat to the ozone layer and yet are sufficiently safe in terms of their flashpoints and flammability to undergo routine processing without having to undertake extreme precautions can be selected. These can include $C_5$-$C_7$ hydrocarbons and higher boiling point hydrocarbons and aromatics, i.e., those with boiling points greater than about 90° C., such as $C_8$-$C_{24}$ hydrocarbons and mixtures thereof, which have more suitable flashpoints than their $C_5$-$C_7$ counterparts, but are less volatile. Exemplary apolar liquids that can be included in the organic phase include trimethyl benzenes, such as 1,2,3-trimethylbenzene, 1,2,4-trimethylbenzene, and 1,3,5-trimethylbenzene; tetra-methyl-benzenes, such as 1,2,3,4-tetramethylbenzene, 1,2,4,5-tetramethylbenzene and 1,3,4,5-tetramethylbenzene; pentamethylbenzene, hexamethylbenzene, di-isopropyl-benzenes, tri-isopropyl-benzenes, and tetra-isopropyl-benzene. In some embodiments, the organic phase includes polyfunctional acyl halide and 1,3,5-trimethylbenzene.

The organic phase can include antioxidants. For example, antioxidants for processing and long-term thermal stabilization can be included in the organic phase. Antioxidants can protect the membrane against degradation, for example, from light exposure. Exemplary antioxidants include phenolic primary antioxidants, such as the phenolic primary antioxidant pentaerythritol tetrakis(3-(3,5-di-tert-butyl-4-hydroxyphenyl)propionate), sold as Irganox® 1010. The antioxidant can be dissolved in the organic phase in a range of, for example, from about 0.0025 wt % to 0.05 wt %, or from about 0.005 wt % to 0.025 wt %, or from about 0.01 wt % to about 0.025 wt %.

The polyfunctional acyl halide can be dissolved in the non-polar organic liquid in a range of, for example, from about 0.01 wt % to about 10.0 wt %, or from about 0.03 wt % to about 3 wt % or from about 0.05 wt % to about 5 wt %.

In an exemplary embodiment, the non-polar solution is formed by mixing one or more components, when present, in the following order: antioxidant, e.g., tetrakis(3-(3,5-di-tert-butyl-4-hydroxyphenyl)propionate); polyfunctional acid halide, e.g., TMC; and a mixture of a non-polar liquid, e.g., 1,3,5-trimethylbenzene, added to an isoparaffinic solvent, e.g., Isopar™ G.

The apolar mixture (e.g., organic phase) typically can be applied by dipping, immersing, coating, spraying or any other application technique.

In some embodiments, the polyfunctional acyl halide monomer (also referred to as acid halide) is coated on the porous support layer, typically by application of the organic phase solution. Amine solution is typically coated first on the porous support followed by the acyl halide solution. The monomers can react when in contact, thereby polymerizing to produce a polymer (e.g., polyamide) matrix discrimination layer at the upper surface of the support layer. Although one or both of the polyfunctional amine and acyl halide layers can be applied to the porous support layer from a solution, such as by application of the aqueous and organic phases discussed above, they can alternatively be applied by other means, such as by vapor deposition, or heat.

In the processes provided herein, the combination of flux enhancing additives that include a dialkyl sulfoxide and a metal chelate additive containing a bidentate ligand and a metal ion or metal atom is added to the aqueous phase or organic phase or both during interfacial polymerization before contact therebetween. By including the combination of flux enhancing additives, increased flux through the membrane is observed, e.g., during reverse osmosis, without substantially affecting salt rejection. In some processes, the combination of flux enhancing additives is added to the aqueous phase. In some processes, the combination of flux enhancing additives is added to the organic phase.

The combination of flux enhancing additives that include a dialkyl sulfoxide and a metal chelate additive containing a bidentate ligand and a metal ion or metal atom is thought to affect the polymerization reaction and ultimately membrane structure leading to improved performance. Nanoparticles, such as zeolites or carbon nanotubes or spherical fullerenes or a combination thereof, also can be present, in either the aqueous phase or the organic phase or both, to modify surface properties or further increase performance, e.g., to improve fouling resistance.

It can be advantageous to store the support layer for a period of time, e.g., from 1 minute for up to one hour, before interfacial polymerization on the support layer between aqueous and organic phase solutions. In some embodiments, the discrimination layer can be formed by applying the organic phase solution to the support layer and, after at least 10 seconds, or after 2 minutes, or 5 minutes after the organic phase solution was applied, applying the aqueous phase to the organic phase solution on the support layer. In some embodiments, the discrimination layer can be formed by applying the aqueous phase to the support layer, allowing it to dry, and then applying the organic phase solution to the dried aqueous phase on the support layer.

Prior to addition to the aqueous phase or organic phase, the combination of flux enhancing additives that include a dialkyl sulfoxide and a metal chelate additive containing a bidentate ligand and a metal ion or metal atom can be subjected to sonic or ultrasonic energy, e.g., from an ultrasonic probe or ultrasonic bath, and/or the aqueous phase and/or the organic phase can be subjected to sonic or ultrasonic just before or during interfacial polymerization. In some applications, an ultrasonic probe can be immersed into the aqueous phase or organic phase containing the combination of flux enhancing additives that include a dialkyl sulfoxide and a metal chelate additive containing a bidentate ligand and a metal ion or metal atom prior to or during interfacial polymerization or both. In some applications, the aqueous phase or organic phase containing the metal chelate can be subjected to ultrasonic energy for a time from about 1 minute to about 60 minutes prior to interfacial polymerization to speed up the process of dissolving the materials. Ultrasonication is not necessary, however, as solvation of the combination of flux enhancing additives can be achieved by stirring.

The amount of metal chelate additive containing a bidentate ligand and a metal atom or metal ion in the combination can be selected to yield a concentration in the aqueous phase or organic phase of from about 0.001 wt % to about 1 wt %, based on the weight of the aqueous phase or organic phase. In some embodiments, the amount of metal chelate additive containing a bidentate ligand and a metal atom or metal ion in the combination can be selected to yield a concentration in the aqueous phase or organic phase of from about 0.005 wt % to about 0.75 wt %, or from about 0.06 wt % to about 0.6 wt %, or from about 0.055 wt % to about 0.55 wt %, based on the weight of the aqueous phase or organic phase. In some embodiments, the amount of metal chelate additive containing a bidentate ligand and a metal atom or metal ion in the combination can be selected to yield a concentration in the aqueous phase or organic phase of at least 0.025 wt %, or at least 0.05 wt %, or at least 0.075 wt %, or at least 0.1 wt %.

The amount of dialkyl sulfoxide in the combination can be selected to yield a concentration in the aqueous phase or organic phase of from about 0.5 wt % to about 5 wt %, based on the weight of the aqueous phase or organic phase. In some embodiments, the amount of dialkyl sulfoxide in the combination can be selected to yield a concentration in the aqueous phase or organic phase of from about 0.75 wt % to about 3 wt %, or from about 1 wt % to about 4.25 wt %, based on the weight of the aqueous phase or organic phase.

Practice of the invention does not depend critically on the overall shape of the thin film composite membrane. Flat sheet and hollow fiber configurations are two of the possibilities for this overall shape. For flat sheet membranes, a discrimination layer can be on the top surface, the bottom surface, or on both surfaces of the support layer. For hollow fiber membranes, a discrimination layer can be on the inner surface of the support layer, the outer surface of the support layer, or on both inner and outer surfaces of the support layer.

3. Protective Layer

The thin film composite semipermeable membrane produced by the methods provided herein can be provided with a protective coating layer by coating the surface of the membrane with an aqueous phase of a water-soluble organic polymer in order to protect the membrane surface from damage during the handling of the membrane. Examples of such a water-soluble organic polymer include polymers such as polyethylenimine, polyvinyl alcohol, polyvinyl ether, polyvinylpyrrolidone, polyacrylamide, or polyacrylic acid; copolymers consisting mainly of the monomers constituting these polymers; derivatives of these polymers or copolymers; and mixtures of these compounds. Among them, polyvinyl alcohol, polyethylenimine and polyvinylpyrrolidone are particularly preferred.

The membrane coated with such an aqueous phase of the water-soluble organic polymer generally is subjected to drying. The drying is effected by exposing the coated membrane to temperature of from about 30° C. to about 100° C. for a time of about 1 minute to about 20 minutes. The time required for drying depends on the type of oven used and membrane placement within the oven. In some embodiments, the oven is a convection oven or and infrared oven. In some embodiments, the oven temperature is from 65°-120° C. In some embodiments, the oven temperature is from 80°-110° C.

4. Anti-Fouling Layer

Anti-fouling layers can be deposited on either or both surfaces of the thin-film composite membrane. An RO membrane can be provided with an anti-fouling capacity by applying a layer capable of forming halamines on the feed stream contact surface of the RO membrane (see U.S. Pat. No. 8,567,612). For example, an anti-fouling layer can be formed by depositing a nitrogen-containing polymer solution on the discrimination layer. The polymer can be cross-linked to insolubilize the anti-fouling layer. An intermediate layer can be positioned between the anti-fouling and the discrimination layer so that the thickness and permeability of the anti-fouling and intermediate layer are sufficient to cause halamine formation at the surface of the anti-fouling layer before the discrimination layer is degraded by the halogen. Sufficient nitrogen can be provided in the anti-fouling layer to protect the discrimination layer from fouling by the formation of halamines on the surface of the anti-fouling layer adjacent the feed stream, to permit recharging of the anti-fouling layer by the further addition of halogens thereto to form additional halamines and/or to prevent halogen damage to the discrimination layer by the halogen during operation after multiple recharging.

Other chemistries and techniques for providing an anti-fouling layer, such as treatment with polyethylene oxide to introduce PEG moieties, or using fluorinated polymers or polyacrylonitrile graft copolymers, are known in the art (e.g., see U.S. Pat. Nos. 8,163,814; 8,505,743; 8,505,745; and 8,754,139, the disclosure of each of which is incorporated by reference herein).

F. Modules

The membranes produced using the processes described herein can be spirally wound around a central porous permeate collection tube to produce a semipermeable membrane module for use in a pressure vessel. A typical spirally wound semipermeable membrane module includes a plurality of leaves that are individual envelopes of sheet-like semipermeable membrane material that sandwich therebetween a layer of porous permeate carrying material, such as polyester fibrous sheet material. The semipermeable membrane material includes the membranes produced using the processes described herein.

Interleaved between adjacent leaves generally are lengths of spacer material, which may be woven or non-woven or other open mesh, screen-like crosswise designs of synthetic filaments, e.g. cross-extruded filaments of polypropylene, that provide flow passageways for the feed water being pumped from end to end through the pressure vessel. An appropriate lay-up of such alternating leaves and spacer sheets is then spirally wound about a hollow tube having a porous sidewall to create a right circular cylindrical module. An exemplary spirally wound separation module is shown in FIG. 1 and in U.S. Pat. No. 4,842,736, the disclosure of which is incorporated herein by reference. The module contains a plurality of spiral feed passageways, through which passageways the feed liquid being treated flows in an axial direction. Internally within the membrane envelopes, the permeating liquid flows along a spiral path inward until it reaches the perforated central tube where it collects and through which it then flows axially to the outlet.

FIG. 1 illustrates an exemplary embodiment of a spiral-wound module. The module includes perforated central tube 1 that collects the filtered fluid. The material of perforated central tube 1 is not limited and can be any material that is resistant to corrosion to the fluid being filtered. In exemplary embodiments, perforated central tube 1 can be made of polyvinyl chloride (PVC). Other materials that can also be used include metals, polymers, ceramics, or combination thereof. Additional exemplary materials that can be used to form the perforated central tube 1 include plastic materials such as acrylonitrile-butadiene-styrene, polysulfone, poly(phenylene oxide), polystyrene, polypropylene, polyethylene or the like. The size and arrangement of the perforations can be arranged in any manner desirable as long as they allow for the filtered fluid to flow into the perforated central tube 1. Wound around perforated central tube 1 is a set of leafs composed of folded permeable membrane sheets 2, feed channel spacers 3, and permeate collection sheet 4. Around the outside of the module is a shell 5 and an anti-telescoping device 6 is located at each end of the module.

Modules containing membranes produced using the processes described herein can be used to produce a stream of potable water from brackish water at relatively low pressure conditions, i.e. not greater than about 225 psi, and in some embodiments at pressures of about 150 psi or less. These low pressure conditions can permit the use of pressure vessels, pumps, valves, and piping having a more moderate pressure rating than usually require for reverse osmosis systems and to thereby avoid the cost of expensive high pressure RO systems. This substantially reduces not only initial capital costs but operating costs as well, compared to standard high pressure seawater desalination systems. Capital costs can be significantly reduced because operating pressures are about one-half to about two-thirds of those used in conventional seawater desalinization systems and pressure vessels rated for a pressure of about 225 psi or below can be used, avoiding the costs associated with design and fabrication of high pressure vessels. In addition, because the operating pressure is lower than that required for conventional seawater RO desalinization installations, the power costs are lower.

G. Membrane Characteristics

In preferred embodiments, the salt rejection is at least 99.5% and the flux of brackish water (2,000 ppm NaCl) is at least 20, 21, 22, 23, 24 or 25 gallons/ft$^2$/day (gfd) at 150 psi.

Water flux can be determined by measuring permeate flow using Equation 1:

$$\text{Flux } (gfd) = \frac{\text{permeate (gallons)}}{\text{membrane area (ft)}^2 \cdot \text{time (day)}}.$$

Salt rejection (R, in %) can be calculated using Equation 2:

$$R\ (\%) = \left(1 - \frac{Cp}{Cf}\right) \times 100$$

where $C_f$ is the concentrations of salt in the feed water and the ($C_p$ is the concentrations of salt in the permeate, both of which can be measured using a calibrated conductivity meter.

H. Examples

Examples 1-3—Comparative Membranes

Three comparative membranes were formed. In Example 1, the aqueous phase included no additives. In Example 2, the aqueous phase included 0.05 wt % metal chelate. In Example 3, the aqueous phase included 3 wt % DMSO.

For each of Examples 1-3, an organic phase was prepared. The organic phase solution was prepared containing 0.348 wt % TMC (Sigma Aldrich, St. Louis, Mo.), 0.014528 wt % Irganox® 1010 (a sterically hindered phenolic anti-oxidant, CAS No. 6683-19-8 from BASF Schweiz AG, Basel, Switzerland), and 8 wt % mesitylene (1,3,5-trimethylbenzene, Sigma Aldrich, St. Louis, Mo.) in an isoparafinic solvent, Isopar™ G solvent (a low odor, low aromatic hydrocarbon solvent from ExxonMobile Chemical Company, Houston, Tex.). The solution was prepared by placing the Isopar G in a first vessel, mixing in a second vessel the Irganox 1010, TMC and mesitylene together to form a mixture, and adding that mixture to the Isopar G in the first vessel. The mesitylene increases flux and decreases rejection. The Irganox 1010 functions as an anti-oxidant to protect the membrane against degradation, e.g., due to light exposure, and has little effect on flux and a slight increase in rejection.

Example 1—No Additives in the Aqueous Phase

In comparative Example 1, an aqueous phase solution containing 4.25 wt % MPD (Dupont, Wilmington, Del.), 6.75 wt % triethylammonium camphorsulfonate (TEACSA, Sunland Chemicals, Los Angeles, Calif.), 0.06 wt % sodium lauryl sulfate (SLS, Columbus Chemical Industries, Inc., Columbus, Wis.) in DI water was prepared by first adding the DI water to a mixing vessel, followed by addition of the TEACSA, MPD and SLS, although any permutation of order of addition of the components can be used. The SLS increases the wettability of the aqueous solution.

Example 2—Metal Chelate Alone in the Aqueous Phase

In comparative Example 2, a metal chelate was included in the aqueous phase. The metal chelate was Sr(F6acac)$_2$, where F6acac refers to 1,1,1,5,5,5-hexafluoro-acetylacetonate, having the structure:

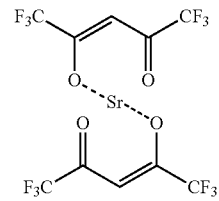

The aqueous phase solution contained 4.25 wt % MPD, 6.75 wt % TEACSA, 0.06 wt % SLS and 0.05% Sr(F6acac)$_2$ in DI water. The aqueous phase was prepared by first adding the DI water to a mixing vessel, followed by addition of the TEACSA, MPD, SLS and Sr(F6acac)$_2$, although any permutation of order of addition of the components to the DI water can be used.

Example 3—Dialkyl Sulfoxide Alone in the Aqueous Phase

In comparative Example 3, the dialkyl sulfoxide DMSO was included in the aqueous phase. The aqueous phase solution contained 4.25 wt % MPD, 6.75 wt % TEACSA, 0.06 wt % SLS and 3 wt % DMSO in DI water. The aqueous phase was prepared by first adding the DI water to a mixing vessel, followed by addition of the TEACSA, MPD, SLS and DMSO, although any permutation of order of addition of the components to the DI water can be used.

Membrane Formation

A piece of wet polysulfone support was placed flat on a clean glass plate. An acrylic frame was then placed onto the support surface, leaving an area for the interfacial polymerization reaction to take place.

For each of comparative Examples 1-3, a 50 mL aliquot of the aqueous solution prepared as described above was poured onto the framed support surface and allowed to remain there for 10 seconds. The support was maintained at ambient temperature, humidity and pressure. The aqueous centrations of salt in the feed water ($C_f$) and the permeate ($C_p$) were measured using a calibrated conductivity meter, and salt rejection R (in %) was calculated using the Equation 2. The results for each comparative Example are shown in Table 1.

TABLE 1

Membrane Characteristics for Comparative Example Membranes

| Test Conditions | Example 1 - No additives | | Example 2 - Metal Chelate Only | | Example 3 - DMSO Only | |
|---|---|---|---|---|---|---|
| | Rejection (%) | Flux (gfd) | Rejection (%) | Flux (gfd) | Rejection (%) | Flux (gfd) |
| 1 hr 150 psi, BW | 98.89 ± 0.49 | 12.69 ± 0.81 | 99.6 ± 0.10 | 15.03 ± 0.98 | 99.31 ± 0.05 | 15.31 ± 0.42 |
| Change from Example 1 | — | — | 0.71 | 2.34 | 0.42 | 2.62 |
| % change | — | — | 0.72 | 18.44 | 0.42 | 20.65 |
| 1 hr, 225 psi, BW | 99.33 ± 0.29 | 19.56 ± 0.55 | 99.71 ± 0.04 | 26.56 ± 1.05 | 99.67 ± 0.03 | 27.45 ± 0.69 |
| Change from Example 1 | — | — | 0.38 | 7 | 0.34 | 7.89 |
| % change | — | — | 0.38 | 35.79 | 0.34 | 40.34 |
| 1 hr, 800 psi, SW | 99.55 ± 0.05 | 26.84 ± 0.26 | 99.43 ± 0.11 | 35.14 ± 0.56 | 99.33 ± 0.15 | 34.05 ± 2.77 |
| Change from Example 1 | — | — | −0.12 | 8.3 | −0.22 | 7.21 |
| % change | — | — | −0.12 | 30.92 | −0.22 | 26.86 | solution was drained from each surface by tilting the frame (vertically) for 5 seconds. For each Example, the frame was taken off, and the support was allowed to rest horizontally for at least 4 minutes, at which point most of the surface water had evaporated (air dried). Any residual surface liquid can be removed using, e.g., a roller, a vacuum bar or an air knife. The support was reframed using another clean and dry acrylic frame.

Then, for each Example, a 50 mL aliquot of the organic phase solution prepared as described above was poured onto the treated framed support surface and allowed to remain there for 10 seconds. The solution was drained from the surface by tilting the frame (vertically) for 10 seconds. The treated support containing a membrane on its surface then was dried in a convection oven at 95° C. until dry (about 8 minutes, depending on the type of oven used and membrane placement within the oven). Membrane performance was tested at this point (D1).

Membrane performance was measured in a flat sheet cell test apparatus. The testing was conducted at a Reynolds number of 2500, so that build-up of rejected solutes at the membrane surface leads to a concentration no more than 10% higher than that in the bulk. Testing was performed on brackish water (BW, 2,000 ppm NaCl in deionized or RO water) at 150 psi, at 25° C. Membranes were run for 1 hour before performance characteristics (e.g., water flux and salt rejection) were measured. The membrane characteristics also were measured after 8 hrs of testing. Separate membranes also were tested after 1 hour at 225 psi using brackish water, and after 1 hour at 800 psi using seawater. Two membranes of each condition, with 3 coupons in one membrane, were tested, so that a total of 6 coupon replicates were tested to arrive at an average value and the stated standard deviation.

Water flux was determined by measurement of permeate flow as previously described, using Equation 1. The con- The data show that the addition of the metal chelate alone or the DMSO alone to the aqueous phase during preparation of the membrane results in a membrane having improved flux with negligible impact on the rejection for all three test conditions as compared to the control membrane prepared with no additives added to the aqueous phase during preparation of the membrane (Example 1). The largest increase in flux was observed in test conditions using brackish water at 225 psi, where an increase in flux of almost 40% over the control membrane was observed when DMSO was included in the aqueous phase, and an increase of more than 35% in the flux when the metal chelate was added to the aqueous phase during formation of the membrane.

The membrane tested at 150 psi, brackish water was tested for an additional 60 hours. The membrane performance values did not decline even after continuous operation for an additional 60 hours, demonstrating the stability of the membranes.

Example 4. Combination Provided Herein in Aqueous Phase

A membrane was prepared using an aqueous phase containing the flux enhancing combination provided herein. An aqueous phase solution containing 4.25 wt % MPD, 6.75 wt % TEACSA, 0.06 wt % SLS and 3.05 wt % of the flux enhancing combination provided herein that contains a combination of 60 parts DMSO to 1 part Sr(F6acac)$_2$, where 3.05 wt % of the combination yields 0.05 wt % Sr(F6acac)$_2$ as the metal chelate additive containing a bidentate ligand (acac) and a metal atom or metal ion (Sr) and 3 wt % DMSO as the dialkyl sulfoxide) in DI water, was prepared. The aqueous phase was prepared by first adding the DI water to a mixing vessel, followed by addition of the TEACSA, MPD, SLS and flux enhancing combination provided herein, although any permutation of order of addition of the components can be used.

An organic phase solution was prepared containing 0.348 wt % TMC, 0.014528 wt % Irganox® 1010 and 8 wt % mesitylene in Isopar™ G solvent. The solution was prepared by placing the Isopar G in a first vessel, mixing in a second vessel the Irganox 1010, TMC and mesitylene together to form a mixture, and adding that mixture to the Isopar™ G in the first vessel.

The membrane was prepared as described above for Examples 1-3.

Membrane performance was measured in a flat sheet cell test apparatus. The testing was conducted at a Reynolds number of 2500, so that build-up of rejected solutes at the membrane surface leads to a concentration no more than 10% higher than that in the bulk. Testing was performed on brackish water (BW, 2,000 ppm NaCl in deionized or RO water) at 150 psi, at 25° C. Membranes were run for 1 hour before performance characteristics (e.g., water flux and salt rejection) were measured. The membrane characteristics also were measured after 8 hrs of testing. Separate membranes also were tested after 1 hour at 225 psi using brackish water, and after 1 hour at 800 psi using seawater.

Water flux was determined by measurement of permeate flow as previously described, using Equation 1. The concentrations of salt in the feed water ($C_f$) and the permeate ($C_p$) were measured using a calibrated conductivity meter, and salt rejection R (in %) was calculated using the Equation 2. The results are shown in Table 2.

TABLE 2

Membrane Characteristics

Example 4 - Metal Chelate + DMSO in Aqueous Phase

| Test Conditions | Rejection (% ± std. dev.) | Flux (gfd ± std. dev.) |
|---|---|---|
| 1 hr 150 psi, BW | 99.65 ± 0.21 | 25.55 ± 4.53 |
| Change from Example 1 | 0.76 | 12.86 |
| % change | 0.77 | 101.34 |
| 1 hr, 225 psi, BW | 99.50 | 35.31 |
| Change from Example 1 | 0.17 | 15.75 |
| % change | 0.17 | 80.52 |
| 1 hr, 800 psi, SW | 98.79 | 42.83 |
| Change from Example 1 | −0.76 | 15.99 |
| % change | −0.76 | 59.58 |

The data show that the addition of the combination of metal chelate and DMSO to the aqueous phase during preparation of the membrane results in a membrane having significantly improved flux with either slightly improved or negligible negative impact on the rejection for all three test conditions as compared to the control membrane prepared with no additives added to the aqueous phase during preparation of the membrane (Example 1). The largest increase in flux was observed in test conditions using brackish water at 150 psi, where an increase in flux of greater than 100% over the control membrane was observed when the flux enhancing combination of metal chelate and dialkyl sulfoxide was included in the aqueous phase. Significant increases in flux while substantially maintaining rejection also were observed for brackish water tested as 225 and sea water tested at 800 psi, and an increase of more than 35% in the flux when the metal chelate was added to the aqueous phase during formation of the membrane.

Demonstrated Synergy in Flux Values

The data demonstrates a synergistic interaction between the metal chelate and DMSO on flux values when the combination is added to the aqueous phase during formation of the membrane. The synergy is apparent when the data are compared, as shown in Table 3.

TABLE 3

Comparing % Change Values to Illustrate Synergistic Interaction

| Additive | 1 hr, 150 psi, BW | 1 hr, 225 psi, BW | 1 hr, 800 psi, SW |
|---|---|---|---|
| | % Change in Flux Values | | |
| Ex. 2 Metal Chelate Only | 18.44 | 35.79 | 30.92 |
| Ex. 3, DMSO only | 20.65 | 40.34 | 26.86 |
| Sum of % Change for Example 2 and Example 3 | 39.09 | 76.13 | 57.78 |
| % Change Observed for Ex. 4, Metal Chelate + DMSO | 101.34 | 80.52 | 59.58 |
| | % Change in Rejection Values | | |
| Ex. 2 Metal Chelate Only | 0.71 | 0.38 | −0.12 |
| Ex. 3, DMSO only | 0.42 | 0.34 | −0.22 |
| Sum of % Change for Example 2 and Example 3 | 1.13 | 0.72 | −0.34 |
| % Change Observed for Ex. 4, Metal Chelate + DMSO | 0.76 | 0.17 | −0.76 |

The percentage change in flux of the membrane prepared with an aqueous phase containing the combination of metal chelate plus DMSO tested at 150 psi in brackish water was 101.34, which is significantly higher than the sum of the percentage change values for the membranes of Examples 2 and 3 (the sum of which is 39.09). Thus, the improvement observed in the flux of the membrane prepared with an aqueous phase containing the combination of metal chelate plus DMSO was higher than the additive effect of the change in flux achieved when DMSO alone or metal chelate alone is added to the aqueous phase during formation of the membrane. Synergy was observed for all conditions tested, although the difference was more pronounced in the membranes tested at low energy brackish water conditions than observed for high energy sea water conditions.

The percentage change in salt rejection of the membranes compared to the control membrane without any additives in the aqueous phase during formation of the membrane generally is less than 1% for all tested conditions. These values indicate that the additives help to maintain salt rejection as the flux of the membrane increases.

Examples 5-7—Flux Enhancing Combination+HMPA

Membranes were prepared with an aqueous phase containing a flux enhancing combination provided herein as well as the polar aprotic solvent HMPA added to the aqueous phase. Three different flux enhancing combinations were tested. In the membrane of Example 5, the flux enhancing combination in the aqueous phase was a combination of 26 parts DMSO to 1 part Sr(F6acac)$_2$, where 1.35 wt % of the combination yields 0.05 wt % Sr(F6acac)$_2$ as the metal chelate additive containing a bidentate ligand (acac) and a metal atom or metal ion (Sr) and 1.3 wt % DMSO as the dialkyl sulfoxide. The aqueous phase solution containing 1.35 wt % of this flux enhancing combination, 4.25 wt % MPD, 6.75 wt % TEACSA, 0.06 wt % SLS and 0.5 wt % HPMA was prepared by first adding the DI water to a mixing vessel, followed by addition of the TEACSA, MPD, SLS, HMPA, and flux enhancing combination provided herein, although any permutation of order of addition of the components can be used.

In the membrane of Example 6, the flux enhancing combination in the aqueous phase was a combination of 52 parts DMSO to 1 part Sr(F6acac)$_2$, where 2.65 wt % of the combination yields 0.05 wt % Sr(F6acac)$_2$ as the metal chelate additive containing a bidentate ligand (acac) and a metal atom or metal ion (Sr) and 2.6 wt % DMSO as the dialkyl sulfoxide. The aqueous phase solution containing 2.65 wt % of this flux enhancing combination, 4.25 wt % MPD, 6.75 wt % TEACSA, 0.06 wt % SLS and 0.5 wt % HPMA was prepared by first adding the DI water to a mixing vessel, followed by addition of the TEACSA, MPD, SLS, HMPA, and flux enhancing combination provided herein, although any permutation of order of addition of the components can be used.

In the membrane of Example 7, the flux enhancing combination in the aqueous phase was a combination of 60 parts DMSO to 1 part Sr(F6acac)$_2$, wherein 3.05 wt % of the combination yields 0.05 wt % Sr(F6acac)$_2$ as the metal chelate additive containing a bidentate ligand (acac) and a metal atom or metal ion (Sr) and 3 wt % DMSO as the dialkyl sulfoxide. An aqueous phase solution containing 3.05 wt % of this flux enhancing combination, 4.25 wt % MPD, 6.75 wt % TEACSA, 0.06 wt % SLS and 0.5 wt % HPMA was prepared by first adding the DI water to a mixing vessel, followed by addition of the TEACSA, MPD, SLS, HMPA, and flux enhancing combination provided herein, although any permutation of order of addition of the components can be used.

An organic phase solution was prepared containing 0.348 wt % TMC, 0.014528 wt % Irganox® 1010 and 8 wt % mesitylene in Isopar™ G solvent. The solution was prepared by placing the Isopar G in a first vessel, mixing in a second vessel the Irganox 1010, TMC and mesitylene together to form a mixture, and adding that mixture to the Isopar™ G in the first vessel.

The membranes were prepared as described above for Examples 1-3.

Membrane performance was measured in a flat sheet cell test apparatus. The testing was conducted at a Reynolds number of 2500, so that build-up of rejected solutes at the membrane surface leads to a concentration no more than 10% higher than that in the bulk. Testing was performed on brackish water (BW, 2,000 ppm NaCl in deionized or RO water) at 150 psi, at 25° C. Membranes were run for 1 hour before performance characteristics (e.g., water flux and salt rejection) were measured. For the membranes of Example 7, separate membranes also were tested after 1 hour at 225 psi using brackish water, and after 1 hour at 800 psi using seawater.

Water flux was determined by measurement of permeate flow as previously described, using Equation 1. The concentrations of salt in the feed water ($C_f$) and the permeate ($C_p$) were measured using a calibrated conductivity meter, and salt rejection R (in %) was calculated using the Equation 2. Membranes were tested after the first drying step (D1). The results are shown in Table 4.

TABLE 4

Membranes prepared with flux enhancing combination plus 0.5% HMPA

| Example | Test Condition | Flux Enhancing Combination (DMSO:Sr(F6acac)$_2$) | Flux (gfd) | Rejection (%) |
|---|---|---|---|---|
| 5 | 150 psi, BW | 26:1 | 21.89 ± 0.36 | 99.40 ± 0.14 |
| 6 | 150 psi, BW | 52:1 | 24.64 ± 1.22 | 99.33 ± 0.18 |
| 7 | 150 psi, BW | 60:1 | 26.34 ± 0.99 | 99.34 ± 1.06 |
| 7 | 225 psi, BW | 60:1 | 42.61 ± 1.98 | 99.55 ± 0.08 |
| 7 | 800 psi, SW | 60:1 | 47.31 ± 0.42 | 98.37 ± 0.22 |

When compared to the flux values obtained for membranes of Example 4, which included the flux enhancing combination of metal chelate and DMSO in the aqueous phase during membrane formation, the addition of HMPA further improved membrane flux. For the 150 psi, BW test condition, the addition of the HMPA resulted in a 3.1% improvement in flux compared to a comparable membrane without HMPA (Example 4). For the 225 psi, BW test condition, the addition of the HMPA resulted in a 20.7% improvement in flux. For the 800 psi, SW test condition, the addition of the HMPA resulted in a 10.5% improvement in flux. Negligible changes in rejection were observed compared to the membrane of Example 4. Accordingly, additional improvement to the enhancement in flux achieved by including the flux enhancing combination of the metal chelate and dialkyl sulfoxide in the aqueous phase during membrane formation can be achieved by including HMPA with the combination of metal chelate and dialkyl sulfoxide.

Scanning Electron Microscopy of Membranes

Figure 2:
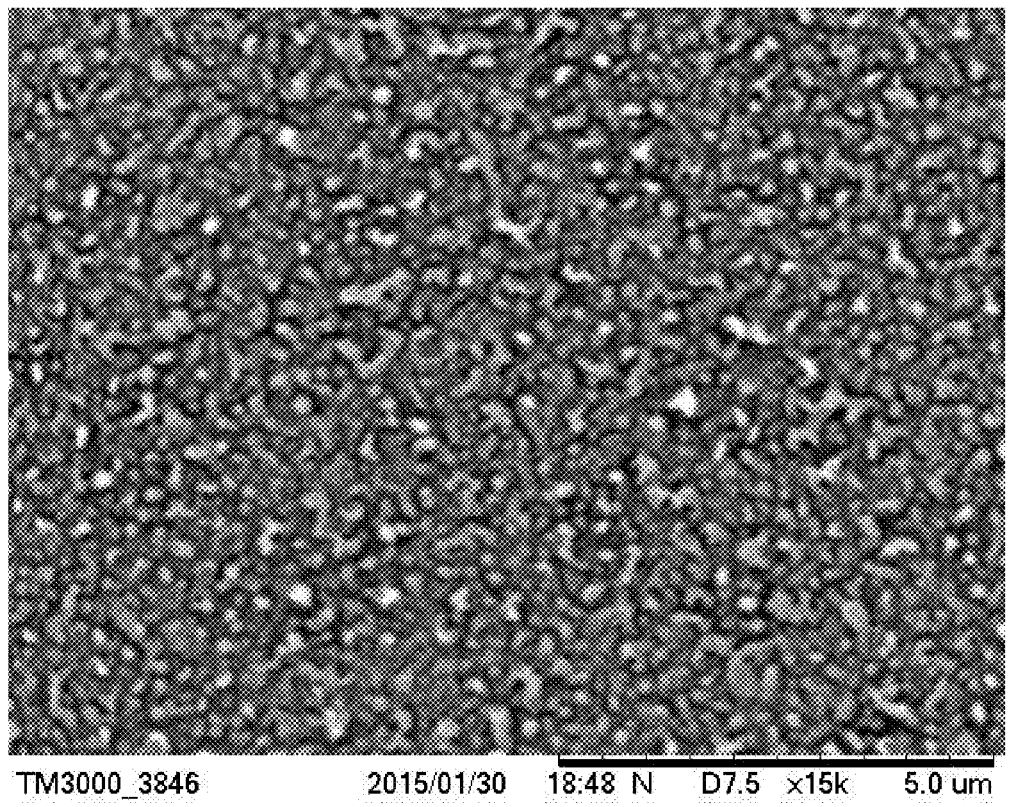
FIG. 2 is a scanning electron micrograph (SEM) of a membrane prepared with no dialkyl sulfoxide or metal chelate additive in the aqueous phase.
Figure 3:
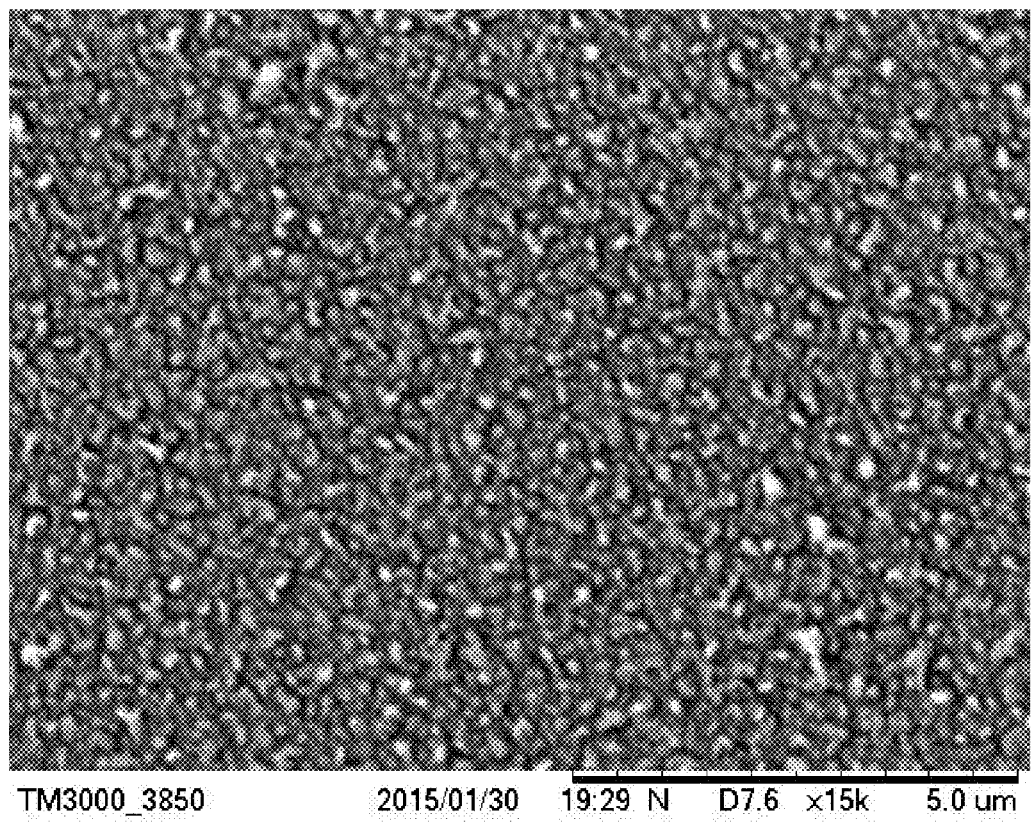
FIG. 3 is an SEM of a membrane prepared with 3 wt % dimethyl sulfoxide in the aqueous phase.
Figure 4:
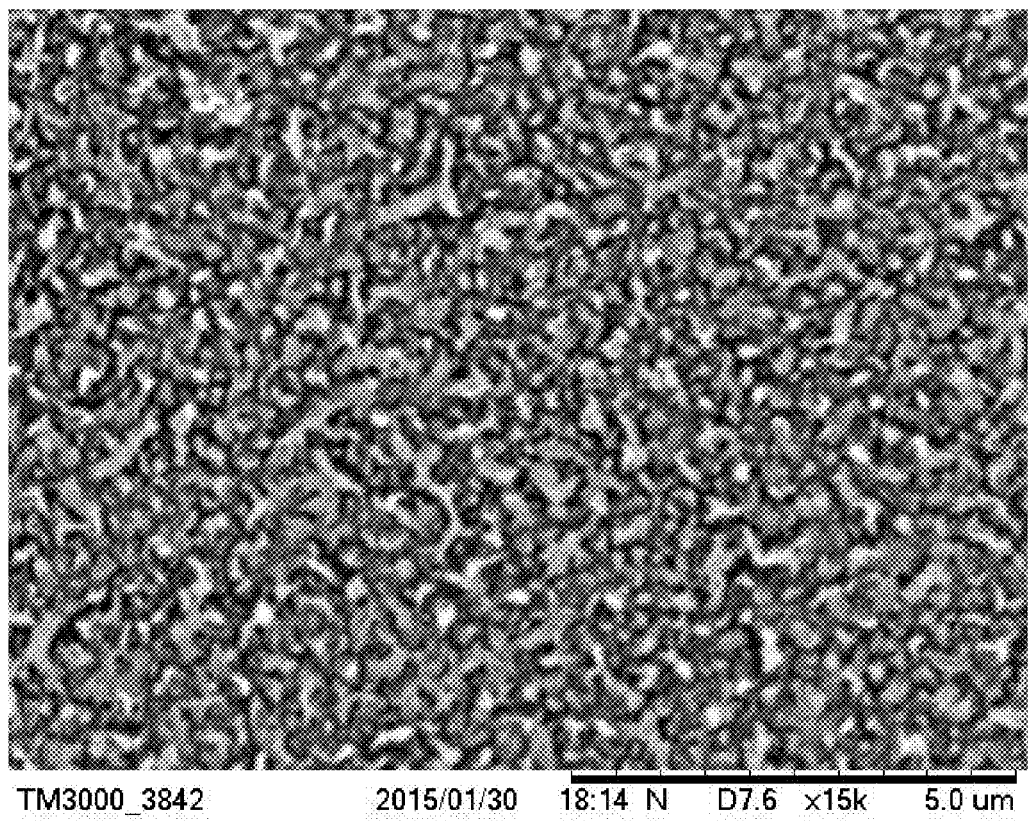
FIG. 4 is an SEM of a membrane prepared with a combination of 3 wt % dimethyl sulfoxide and 0.05 wt % Sr(F6acac)$_2$, where "F6acac" refers to 1,1,1,5,5,5-hexafluoro-acetylacetonate in the aqueous phase. % Sr(F6acac)$_2$, where "F6acac" refers to 1,1,1,5,5,5-hexafluoro-acetylacetonate.

In order to examine the topography of RO membranes made with an aqueous phase containing the flux enhancing combination provided herein, scanning electron microscopy (SEM) of the membranes was performed. In order to improve the imaging of the samples, a gold sputter coating for two to three minutes was applied to form a layer of about 2 nm using typical application methods (e.g., see Wend et al., Water Research 37: 3367-3378 (2003)). Micrographs for the tested membranes are shown in FIGS. 2-4. FIG. 2 is a scanning electron micrograph (SEM) of a membrane prepared with no dialkyl sulfoxide or metal chelate additive in the aqueous phase. FIG. 3 is an SEM of a membrane prepared with 3 wt % dimethyl sulfoxide in the aqueous phase. FIG. 4 is an SEM of a membrane prepared with a combination of 3 wt % dimethyl sulfoxide and 0.05 wt % Sr(F6acac)$_2$, where "F6acac" refers to 1,1,1,5,5,5-hexafluoro-acetylacetonate in the aqueous phase. In the micrographs, the white areas are elevated or are peaks, while the dark areas are valleys. The topography of the membrane prepared with an aqueous phase containing no additive and the membrane prepared with an aqueous phase containing dimethyl sulfoxide during preparation of the membranes is similar. When the flux enhancing combination of dimethyl sulfoxide and Sr(F6acac)$_2$ is included in the aqueous phase during formation of the membrane, the surface of the resulting membrane is significantly rougher, as evidenced by the large differences in the light and dark regions in the micrograph of FIG. 4.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A process for preparing a thin film composite membrane, comprising:
   (a) preparing an aqueous phase comprising a polyamine, and an organic phase comprising a polyfunctional acid halide, wherein the aqueous phase or organic phase or both further include a flux enhancing combination that comprises:
      (i) a metal chelate additive containing a bidentate ligand and a metal atom or metal ion; and
      (ii) a dialkyl sulfoxide;
   (b) applying the aqueous phase to a surface of a porous support membrane to form a coated support membrane; and
   (c) applying the organic phase to the coated support membrane and interfacially polymerizing the polyamine and the polyfunctional acid halide to form a discrimination layer of a thin film composite membrane comprising the porous support membrane and the discrimination layer, the thin film composite membrane having a water flux that is greater than the water flux of a thin film composite membrane prepared in the absence of the water flux enhancing combination.

2. The process of claim 1, wherein the bidentate ligand is selected from among:

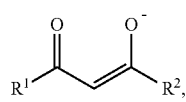

Formula 1

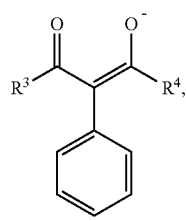

Formula 2

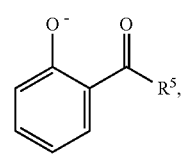

Formula 3

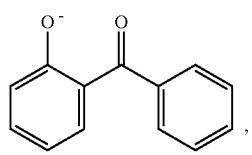

Formula 4

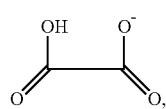

Formula 5

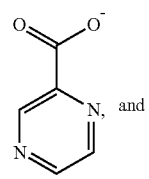

Formula 6 and

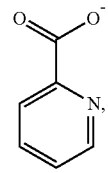

Formula 7 wherein each of $R^1$, $R^2$, $R^3$, $R^4$ and $R^5$ separately is selected from among a $C_1$-$C_{10}$ alkyl, a halogenated $C_1$-$C_{10}$ alkyl, a 5-membered aromatic ring, a 6-membered aromatic ring, an aromatic bicyclic ring system containing two fused 6-membered rings, and an aromatic bicyclic ring system containing a 5-membered ring fused to a 6-membered aromatic ring.

3. The process of claim 1, wherein the bidentate ligand is an acetylacetonate (acac) or fluorinated acetylacetonate.

4. The process of claim 1, wherein the metal chelate additive containing a bidentate ligand and a metal atom or metal ion is selected from among Al(acac)$_3$, Al(F6acac)$_3$, Ba(acac)$_2$, Ba(F6acac)$_2$, Be(acac)$_2$, Be(F6acac)$_2$, Ca(acac)$_2$, Ca(F6acac)$_2$, Cd(acac)$_2$, Cd(F6acac)$_2$, Ce(acac)$_3$, Ce(F6acac)$_3$, Cr(acac)$_3$, Co(acac)$_3$, Cu(acac)$_2$, Cu(F6acac)$_2$, Dy(acac)$_3$, Er(acac)$_3$, Fe(acac)$_2$, Fe(acac)$_3$, Ga(acac)$_3$, Hf(acac)$_4$, In(acac)$_3$, K(acac), Li(acac), Mg(acac)$_2$, Mg(F6acac)$_2$, Mn(acac)$_2$, Mn(acac)$_3$, MoO$_2$(acac)$_2$, MoO$_2$(F6acac)$_2$, Na(acac), Nd(acac)$_3$, Nd(F6acac)$_3$, Ni(acac)$_2$, Ni(F6acac)$_2$, Pd(acac)$_2$, Pr(acac)$_3$, Pr(F6acac)$_3$, Ru(acac)$_3$, Ru(F6acac)$_3$, Sc(acac)$_2$, Sc(F6acac)$_2$, Sm(acac)$_3$, Sn(acac)$_2$, Sn(acac)$_2$Cl$_2$, t-butyl-Sn(acac)$_2$, t-butyl-Sn(acac)$_2$Cl$_2$, Sn(F6acac)$_2$, Sr(acac)$_2$, Sr(F6acac)$_2$, Tb(acac)$_3$, V(acac)$_3$, Y(acac)$_3$, Y(F6acac)$_3$, Zn(acac)$_2$, Zn(F6acac)$_2$, and Zr(acac)$_4$, wherein F6acac refers to 1,1,1,5,5,5-hexafluoroacetylacetonate.

5. The process of claim 1, wherein the bidentate ligand is a beta-diketonate or a fluorinated beta-diketonate.

6. The process of claim 5, wherein the bidentate ligand is selected from among pentane-2,4-dionate, 1,5-difluoro-pentane-2,4-dionate, 1,1,5,5-tetrafluoropentane-2,4-dionate, 1,1,1,5,5,5-hexafluoro-pentane-2,4-dionate, propane-1,3-dionate, butane-1,3-dionate, 4-fluorobutane-1,3-dionate, 4,4-difluorobutane-1,3-dionate, 4,4,4-trifluorobutane-1,3-dionate, heptane-3,5-dionate, 1-fluorohexane-2,4-dionate, 1,5-difluoropentane-2,4-dionate, 1,1,5-trifluoropentane-2,4-dionate, 1,1,5,5-tetrafluoro-pentane-2,4-dionate, 1,1,1,5,5-pentafluoro-pentane-2,4-dionate, 1,1,1,5,5,5-hexafluoropentane-2,4-dionate and octane-3,5-dionate and combinations thereof.

7. The process of claim 1, wherein the amount of bidentate ligand in the metal chelate additive yields a concentration of bidentate ligand in the aqueous phase or organic phase of from about 0.001 wt % to about 1 wt %, based on the weight of the aqueous phase or organic phase.

8. The process of claim 1, wherein the metal atom or metal ion is selected from Group 2 or Group 13 of the periodic table.

9. The process of claim 1, wherein the metal atom or metal ion is an alkaline earth metal.

10. The process of claim 1, wherein the amount of metal atom or metal ion in the metal chelate additive yields a concentration of metal atom or metal ion in the aqueous phase or the organic phase of from about 0.00001 wt % to about 1 wt %, based on the weight of the aqueous phase or the organic phase.

11. The process of claim 1, wherein the amount of metal chelate additive in the combination added to the aqueous phase or organic phase yields a concentration of metal chelate in the aqueous phase of the organic phase of from about 0.001 wt % to about 1 wt %, based on the weight of the aqueous phase or the organic phase.

12. The process of claim 1, wherein the dialkyl sulfoxide is of the formula:

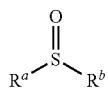

wherein each of $R^a$ and $R^b$ independently is selected from among $C_1$-$C_{25}$ alkyl and $C_1$-$C_{20}$ hydroxyalkyl.

13. The process of claim 1, wherein the amount of dialkyl sulfoxide present in the combination results in a concentration of dialkyl sulfoxide in the aqueous phase or the organic phase of from about 0.5 wt % to 5 wt % based on the weight of the aqueous phase or the organic phase.

14. The process of claim 1, wherein the dialkyl sulfoxide is dimethyl sulfoxide or diethyl sulfoxide.

15. The process of claim 1, wherein the process further comprises adding a processing aid selected from among a surfactant, a co-solvent, a drying agent, a catalyst or any combination thereof to the aqueous phase prior to applying the aqueous phase to the porous support membrane.

16. The process of claim 15, wherein the amount of processing aid in the aqueous phase is from about 0.001 wt % to about 10 wt % based on the weight of the aqueous phase.

17. The process of claim 1, further comprising adding hexamethyl phosphoramide to the aqueous phase or organic phase or both.

18. The process of claim 1, wherein the aqueous phase or the organic phase or both further comprises nanoparticles selected from among zeolites, fullerenes and carbon nanotubes and combinations thereof.

19. The process of claim 18, wherein:
 a) the nanoparticles are present in the aqueous phase in an amount from about 0.001 wt % to about 0.5 wt % based on the weight of the aqueous phase; or
 b) the nanoparticles are present in the organic phase in an amount from about 0.001 wt % to about 0.5 wt % based on the weight of the organic phase; or
 c) both a) and b).

20. The process of claim 1, wherein the thin film composite membrane is a reverse osmosis membrane.

* * * * *